US008971256B2

(12) United States Patent
Bracha

(10) Patent No.: US 8,971,256 B2
(45) Date of Patent: Mar. 3, 2015

(54) AD-HOC DIRECTIONAL COMMUNICATION IN CONTENTION ACCESS PERIOD

(75) Inventor: Vered Bar Bracha, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 1100 days.

(21) Appl. No.: 12/555,469

(22) Filed: Sep. 8, 2009

(65) Prior Publication Data

US 2010/0265895 A1 Oct. 21, 2010

Related U.S. Application Data

(60) Provisional application No. 61/169,534, filed on Apr. 15, 2009, provisional application No. 61/177,411, filed on May 12, 2009.

(51) Int. Cl.
*H04W 72/04* (2009.01)
*H04W 74/08* (2009.01)
*H04W 84/18* (2009.01)

(52) U.S. Cl.
CPC .......... *H04W 74/0808* (2013.01); *H04W 84/18* (2013.01)
USPC ....................................... 370/329

(58) Field of Classification Search
CPC . H04W 74/0808; H04W 84/18; H04W 48/16; H04B 7/0408
USPC .......... 370/310, 328, 329, 431, 445; 455/403, 455/422.1, 435.1
See application file for complete search history.

(56) References Cited

U.S. PATENT DOCUMENTS

| 6,823,186 | B2 | 11/2004 | Salokannel et al. |
| 6,850,502 | B1 | 2/2005 | Kagan et al. |
| 6,975,613 | B1 | 12/2005 | Johansson |
| 6,980,819 | B2 * | 12/2005 | Sugaya et al. ................ 455/501 |
| 7,002,938 | B2 | 2/2006 | Hester et al. |
| 7,110,380 | B2 * | 9/2006 | Shvodian ...................... 370/336 |
| 7,187,669 | B1 * | 3/2007 | Lee ............................... 370/347 |
| 7,233,804 | B2 * | 6/2007 | Sugaya et al. ................ 455/501 |
| 7,489,646 | B2 * | 2/2009 | Sung et al. .................... 370/280 |

(Continued)

FOREIGN PATENT DOCUMENTS

| JP | 2006352296 A | 12/2006 |
| JP | 2008219554 A | 9/2008 |

(Continued)

OTHER PUBLICATIONS

"IEEE Standard for Information technology—Telecommunications and information exchange between systems—Local and metropolitan area networks—Specific requirements. Part 15.3: Wireless Medium Access Control (MAC) and Physical Layer (PHY) Specifications for High Rate Wireless Personal Area Networks", IEEE Standard, IEEE Piscataway, NJ, USA, Oct. 12, 2009, pp. c1-187, XP017604237.

(Continued)

*Primary Examiner* — Chi H Pham
*Assistant Examiner* — Robert Lopata
(74) *Attorney, Agent, or Firm* — Steven R. Thiel

(57) ABSTRACT

Certain aspects of the present disclosure relate to a method for efficient ad-hoc peer to peer communication in a contention access period, while antenna directions of communicating peers can point to each other. Certain aspects of the present disclosure relate to a method for improved association of a device in a wireless network with a controller of the network.

93 Claims, 22 Drawing Sheets

(56) References Cited

U.S. PATENT DOCUMENTS

| | | | |
|---|---|---|---|
| 7,489,651 B2 | 2/2009 | Sugaya et al. | |
| 7,620,011 B2 | 11/2009 | Kim et al. | |
| 7,639,657 B1* | 12/2009 | Ho et al. | 370/338 |
| 7,724,765 B2* | 5/2010 | Huang et al. | 370/445 |
| 7,826,475 B2* | 11/2010 | Lee et al. | 370/445 |
| 7,881,340 B2 | 2/2011 | Farrag et al. | |
| 8,054,223 B2 | 11/2011 | Lakkis | |
| 8,081,110 B2* | 12/2011 | Lakkis | 342/367 |
| 8,094,577 B2* | 1/2012 | Kwon et al. | 370/252 |
| 2004/0156339 A1 | 8/2004 | Urquhart et al. | |
| 2005/0094657 A1 | 5/2005 | Sung et al. | |
| 2005/0265372 A1 | 12/2005 | Bae et al. | |
| 2006/0209772 A1* | 9/2006 | Fang et al. | 370/338 |
| 2007/0081490 A1 | 4/2007 | Kim et al. | |
| 2007/0230497 A1* | 10/2007 | Choi et al. | 370/442 |
| 2007/0280184 A1 | 12/2007 | Shin et al. | |
| 2007/0280237 A1 | 12/2007 | Shin et al. | |
| 2007/0291714 A1 | 12/2007 | Laroia et al. | |
| 2008/0167038 A1* | 7/2008 | Sun et al. | 455/435.1 |
| 2009/0041156 A1 | 2/2009 | Lakkis | |
| 2009/0059890 A1* | 3/2009 | Cordeiro et al. | 370/348 |
| 2009/0109945 A1* | 4/2009 | Lakkis | 370/338 |
| 2009/0135772 A1 | 5/2009 | Kwon et al. | |
| 2009/0161622 A1* | 6/2009 | Sugaya | 370/329 |
| 2009/0232063 A1* | 9/2009 | Cordeiro et al. | 370/329 |
| 2009/0232112 A1 | 9/2009 | Trainin et al. | |
| 2009/0310573 A1* | 12/2009 | Sim et al. | 370/336 |
| 2010/0014463 A1 | 1/2010 | Nagai et al. | |
| 2010/0118835 A1 | 5/2010 | Lakkis et al. | |
| 2010/0265922 A1 | 10/2010 | Bracha | |

FOREIGN PATENT DOCUMENTS

| | | |
|---|---|---|
| JP | 2009055350 A | 3/2009 |
| KR | 20050040692 A | 5/2005 |
| WO | 2008029686 A2 | 3/2008 |
| WO | 2008069245 A1 | 6/2008 |

OTHER PUBLICATIONS

"IEEE Standard for Information Technology—Telecommunications and Information Exchange Between Systems—Local and Metropolitan Area Networks—Specific Requirements Part 15.3: Wireless Medium Access Control (MAC) and Physical Layer (PHY) Specifications for High Rate Wireless Personal Area Networks", IEEE Standard; [IEEE Standard], IEEE, Piscataway, NJ, USA, Jan. 1, 2003, pp. 1-315, XP017603623.

International Search Report and Written Opinion—PCT/US2010/031305, International Search Authority—European Patent Office—Aug. 20, 2010.

Lakkis etal.: "IEEE802.15.3c Beamforming Overview" No. IEEE 802.11-090355r0, Mar. 12, 2009, XP002595240 Retrieved from the Internet: URL:ieee.org.

Part 15.3: Wireless Medium Access Control (MAC) and Physical layer (PHY) Specifications for High Rate Wireless Personal Area Networks (WPANs): Amendment 2: Millimeter-wave based Alternative Physical Layer Extension Draft Amendment to IEEE Standard for Information Technology—Telecommunications and Information Exchange Between Systems—Local and Metropolitan Area Networks—Specific Requirements—,, vol. IEEE P802.15.3C/D00, Jun. 10, 2008, pp. I-X, XP002573338.

Shuzo Kato, et al., "Common Mode Signalling (CMS) for Intersystem Coexistence Enahncement"No. IEEE 802.11-09-370-02-00ad, Mar. 11, 2009, XP002595100 Retrieved from the Internet:URL:ieee.org.

Taiwan Search Report—TW099111840—TIPO—Feb. 9, 2014.

* cited by examiner

| Bits: 3 | 1 | 1 | 1 | 1 | 2 | 20 | 5 | 1 | 1 | 4 |
|---|---|---|---|---|---|---|---|---|---|---|
| Reserved | PCES | Pilot word length | Low latency mode | Beam tracking | Preamble type | Frame length | MCS | UEP | Aggregation | Scrambler seed ID |
| 1422 | 1420 | 1418 | 1416 | 1414 | 1412 | 1410 | 1408 | 1406 | 1404 | 1402 |

FIG. 14

| 1 | 3 | 1 | 1 | 1 | 2 | 2 |
|---|---|---|---|---|---|---|
| Stream Index | Fragmentation Control | SrcID | DestID | PNID | Frame Control |
| 1512 | 1510 | 1508 | 1506 | 1504 | 1502 |

FIG. 15

AD-HOC DIRECTIONAL COMMUNICATION IN CONTENTION ACCESS PERIOD

CLAIM OF PRIORITY UNDER 35 U.S.C. §119

The present Application for Patent claims benefit of U.S. provisional application Ser. No. 61/169,534 filed Apr. 15, 2009, and U.S. provisional application Ser. No. 61/177,411 filed May 12, 2009, and assigned to the assignee hereof and are hereby expressly incorporated by reference herein.

BACKGROUND

1. Field

Certain aspects of the present disclosure generally relate to a wireless communication and, more particularly, to association between communicating devices and to ad-hoc directional communication in a contention access period.

2. Background

In emerging wireless communication standards, such as the Institute of Electrical and Electronics Engineers (IEEE) 802.15.3c standard, a network coordinator scheduling (e.g., control by a piconet controller or an access point) is mandatory to access a medium for any device-to-device communication. However, efficiency of this access can be very low, particularly for data applications with very random and bursty traffic.

A channel time allocation (CTA), which is a time division multiplexing (TDM) based approach, can provide means to support streaming applications with high data rates. On the other hand, the use of large amount of bursty data is not well supported in the IEEE 802.15.3c standard.

The link budget for transmitting high data rates over 60 GHz frequency band supported by standards such as the IEEE 802.15.3c, IEEE 802.11ad and European Computer Manufacturer's Association Technical Committee 48 (ECMA-TC48) requires considerable antenna gain as well as flexibility in the orientation of end-point devices. This directional communication presents a new challenge for devices communicating with multiple peers in multiple directions. Such devices need to be informed in advance to which direction to set their antennas. However, the nature of contention-based traffic is that it is not always possible to know in advance which directions to use, since anyone of the potential peers may gain access to a medium. Several attempts and restrictions were applied in a contention access period (CAP) specified by the IEEE 802.15.3c standard, but none of them provided an efficient solution for this problem.

Therefore, there is a need in the art for a method to provide efficient ad-hoc peer-to-peer communication in the CAP while ensuring that antenna directions of communicating peers point to each other. Preceding this, it is desirable that peers (i.e., wireless nodes of the network) are associated with the network coordinator.

SUMMARY

Certain aspects provide a method for wireless communications. The method generally includes monitoring, by an apparatus, a medium in a contention access period (CAP) for availability of the medium for data transmission by the apparatus, after determining the medium is available for data transmission by the apparatus, obtaining the medium by transmitting, from the apparatus, a common mode signaling (CMS) frame in the CAP, and transmitting, from the apparatus, at least one data frame to another apparatus in the CAP over a wireless channel of the medium after obtaining the medium.

Certain aspects provide an apparatus for wireless communications. The apparatus generally includes a monitoring circuit configured to monitor a medium in a contention access period (CAP) for availability of the medium for data transmission by the apparatus, and a transmitter configured to obtain the medium by transmitting a common mode signaling (CMS) frame in the CAP, after determining the medium is available for data transmission by the apparatus, and wherein the transmitter is also configured to transmit at least one data frame to another apparatus in the CAP over a wireless channel of the medium after obtaining the medium.

Certain aspects provide an apparatus for wireless communications. The apparatus generally includes means for monitoring a medium in a contention access period (CAP) for availability of the medium for data transmission by the apparatus, means for obtaining the medium by transmitting, from the apparatus, a common mode signaling (CMS) frame in the CAP, after determining the medium is available for data transmission by the apparatus, and means for transmitting at least one data frame to another apparatus in the CAP over a wireless channel of the medium after obtaining the medium.

Certain aspects provide a computer-program product for wireless communications. The computer-program product includes a computer-readable medium encoded with instructions executable to monitor, by an apparatus, a medium in a contention access period (CAP) for availability of the medium for data transmission by the apparatus, obtain the medium by transmitting, from the apparatus, a common mode signaling (CMS) frame in the CAP, after determining the medium is available for data transmission by the apparatus, and transmit, from the apparatus, at least one data frame to another apparatus in the CAP over a wireless channel of the medium after obtaining the medium.

Certain aspects provide a wireless node. The wireless node generally includes at least one antenna, a monitoring circuit configured to monitor a medium in a contention access period (CAP) for availability of the medium for data transmission by the wireless node, and a transmitter configured to obtain the medium by transmitting via the at least one antenna a common mode signaling (CMS) frame in the CAP, after determining the medium is available for data transmission by the wireless node, and wherein the transmitter is also configured to transmit via the at least one antenna at least one data frame to another wireless node in the CAP over a wireless channel of the medium after obtaining the medium.

Certain aspects provide a method for wireless communications. The method generally includes receiving, by an apparatus, a common mode signaling (CMS) frame transmitted by another apparatus indicating access to a medium for data communication by the other apparatus in a contention access period (CAP), receiving, from the other apparatus once the access to the medium for data communication is indicated at the apparatus, at least one data frame over a wireless channel of the medium in the CAP, and transmitting, to the other apparatus, an acknowledgement that the at least one data frame is successfully received over the wireless channel of the medium in the CAP.

Certain aspects provide an apparatus for wireless communications. The apparatus generally includes a receiver configured to receive a common mode signaling (CMS) frame transmitted by another apparatus indicating access to a medium for data communication by the other apparatus in a contention access period (CAP), wherein the receiver is also configured to receive, from the other apparatus once the access to the medium for data communication is indicated at the apparatus, at least one data frame over a wireless channel of the medium in the CAP, and a transmitter configured to transmit, to the other apparatus, an acknowledgement that the at least one data frame is successfully received over the wireless channel of the medium in the CAP.

Certain aspects provide an apparatus for wireless communications. The apparatus generally includes means for receiving a common mode signaling (CMS) frame transmitted by another apparatus indicating access to a medium for data communication by the other apparatus in a contention access period (CAP), means for receiving, from the other apparatus once the access to the medium for data communication is indicated at the apparatus, at least one data frame over a wireless channel of the medium in the CAP, and means for transmitting, to the other apparatus, an acknowledgement that the at least one data frame is successfully received over the wireless channel of the medium in the CAP.

Certain aspects provide a computer-program product for wireless communications. The computer-program product includes a computer-readable medium encoded with instructions executable to receive, by an apparatus, a common mode signaling (CMS) frame transmitted by another apparatus indicating access to a medium for data communication by the other apparatus in a contention access period (CAP), receive, from the other apparatus once the access to the medium for data communication is indicated at the apparatus, at least one data frame over a wireless channel of the medium in the CAP, and transmit, to the other apparatus, an acknowledgement that the at least one data frame is successfully received over the wireless channel of the medium in the CAP.

Certain aspects provide a wireless node. The wireless node generally includes at least one antenna, a receiver configured to receive via the at least one antenna a common mode signaling (CMS) frame transmitted by another wireless node indicating access to a medium for data communication by the other wireless node in a contention access period (CAP), wherein the receiver is also configured to receive via the at least one antenna, from the other wireless node once the access to the medium for data communication is indicated at the wireless node, at least one data frame over a wireless channel of the medium in the CAP, and a transmitter configured to transmit via the at least one antenna, to the other wireless node, an acknowledgement that the at least one data frame is successfully received over the wireless channel of the medium in the CAP.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 14 illustrates a structure of a physical layer (PHY) header of the CMS frame in accordance with certain aspects of the present disclosure.

FIG. 15 illustrates a structure of a medium access control (MAC) header of the CMS frame in accordance with certain aspects of the present disclosure.

DETAILED DESCRIPTION

Figure 1:
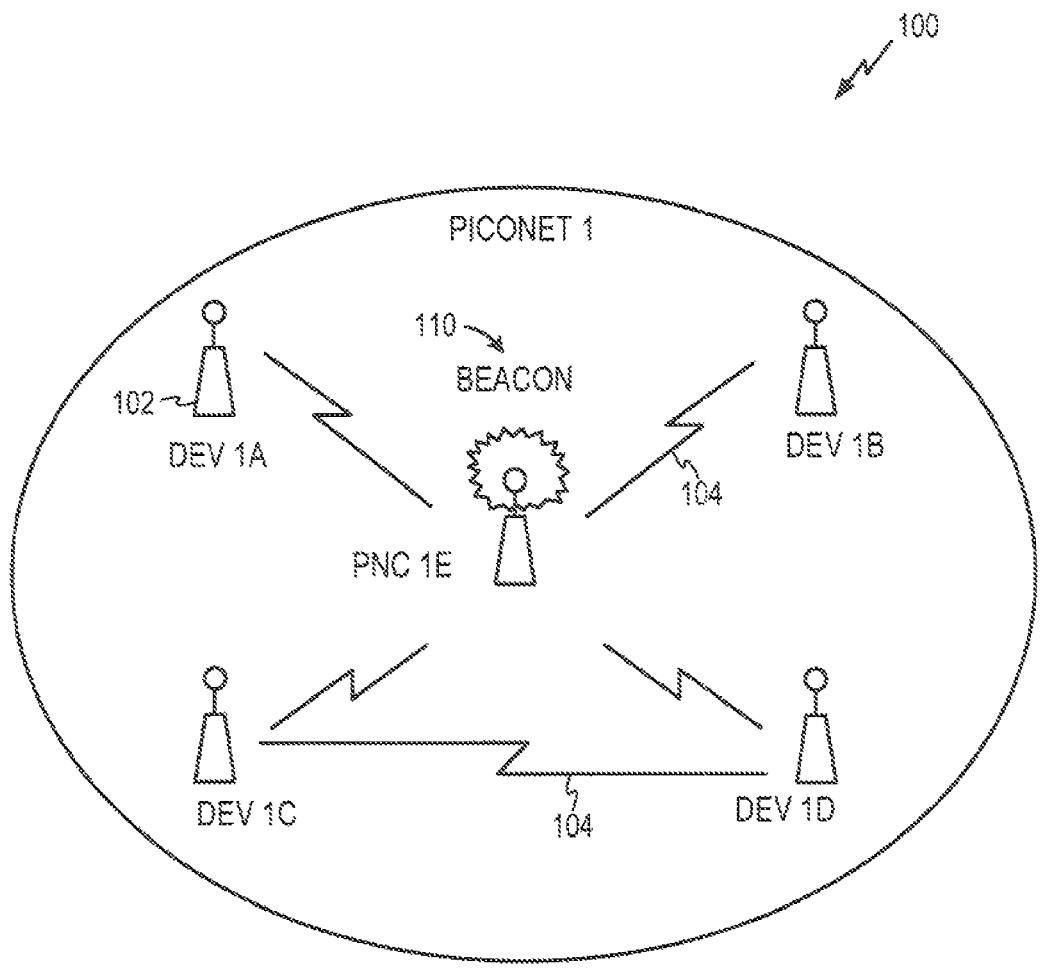
FIG. 1 illustrates an example wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

In the following detailed description, various aspects of the disclosure may be described in the context of a wireless network or "piconet" in accordance to the IEEE 802.15 family of standards (whether adopted or proposed). While these disclosed aspects may be well suited for use with such networks in which an access point (AP) may serve as a piconet coordinator (PNC), those skilled in the art will readily appreciate that these disclosed aspects are likewise applicable for use in various other communication environments utilizing any type of access points (APs) and access terminals (ATs), including, but not limited to, networks in accordance with the IEEE 802.11 family of standards and may, in fact, allow networks in accordance with different standards to better co-exist. Accordingly, any reference to an IEEE 802.15 compliant network is intended only to illustrate the disclosed aspects, with the understanding that such disclosed aspects have a wide range of applications.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium.

In some aspects, the node is a wireless node. Such wireless nodes may provide, for example, connectivity for or to a network (e.g., a personal area network or piconet, wide area network such as the Internet, or a cellular network) via a wired or wireless communication link.

Although particular aspects are described herein, many variations and permutations of these aspects fall within the scope the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

FIG. 1 illustrates an example of a wireless communication system 100 (i.e., a Piconet 1) in which aspects of the present disclosure may be employed. As illustrated, Piconet 1 may include a number of wireless devices 102 or "terminals" 1A-1E that can communicate with one another using relatively short-range wireless links 104. In the illustrated example, terminal 1E acts as a PNC for Piconet 1. Although illustrated with five devices, it should be appreciated that any number of devices (i.e., two or more) may form a wireless personal area network.

Each of the terminals 102 in the Piconet 1 may include, among other things, a wireless transceiver to support wireless communication and controller functionality to manage communication with the network. The controller functionality may be implemented within one or more digital processing devices. The wireless transceiver may be coupled to one or more antennas to facilitate the transmission of signals into and the reception of signals from a wireless channel. Any type of antennas may be used including, for example, dipoles, patches, helical antennas, antenna arrays, and/or others.

The devices in the Piconet 1 may include any of a wide variety of different device types including, for example, laptop, desktop, palmtop, or tablet computers having wireless networking functionality, computer peripherals having wireless networking capability, personal digital assistants (PDAs) having wireless networking capability, cellular telephones and other handheld wireless communicators, pagers, wireless network interface modules (e.g., wireless network interface cards, etc.) incorporated into larger systems, multimedia devices having wireless networking capability, audio/visual devices having wireless networking capability, home appliances having wireless networking capability, jewelry or other wearable items having wireless networking capability, wireless universal serial bus (USB) devices, wireless digital imaging devices (e.g., digital cameras, camcorders, etc.), wireless printers, wireless home entertainment systems (e.g., DVD/CD players, televisions, MP3 players, audio devices, etc.), and/or others. In one configuration, for example, a wireless personal area network may include a user's laptop computer that is wirelessly communicating with the user's personal digital assistant (PDA) and the user's printer in a short-range network. In another possible configuration, a wireless personal area network may be formed between various audio/visual devices in, for example, a user's living room. In yet another configuration, a user's laptop computer may communicate with terminals associated with other users in a vicinity of the user. Many other scenarios are also possible.

Standards have been developed, and are currently in development, to provide a framework to support development of interoperable products that are capable of operating as part of a wireless personal area network (e.g., the Bluetooth standard (Specification of the Bluetooth System, Version 1.2, Bluetooth SIG, Inc., November 2003), the IEEE 802.15 standards, etc.). The IEEE 802.15.3c standard, for example, is a high data rate wireless personal area network standard. In accordance with the IEEE 802.15.3c standard, one of the terminals within a piconet is selected as a Piconet Coordinator (PNC) to coordinate the operation of the network. For example, with reference to FIG. 1, the device PNC 1E represents a PNC for the Piconet 1 in an IEEE 802.15.3c implementation.

As illustrated, PNC 1E may transmit a beacon signal 110 (or simply "beacon") to other devices of Piconet 1, which may help the other terminals within Piconet 1 synchronize their timing with PNC 1E. Thus, the beacon, typically sent at the beginning of every super-frame, contains information that may be used to time-synchronize the terminals in the piconet. Each terminal in the piconet, including the PNC, may reset its super-frame clock to zero at the beginning of the beacon preamble. If a terminal does not hear a beacon, it may reset its super-frame clock to zero at the instant where it expected to hear the beginning of the beacon preamble (e.g., based on previous super-frame timing).

Figure 2:
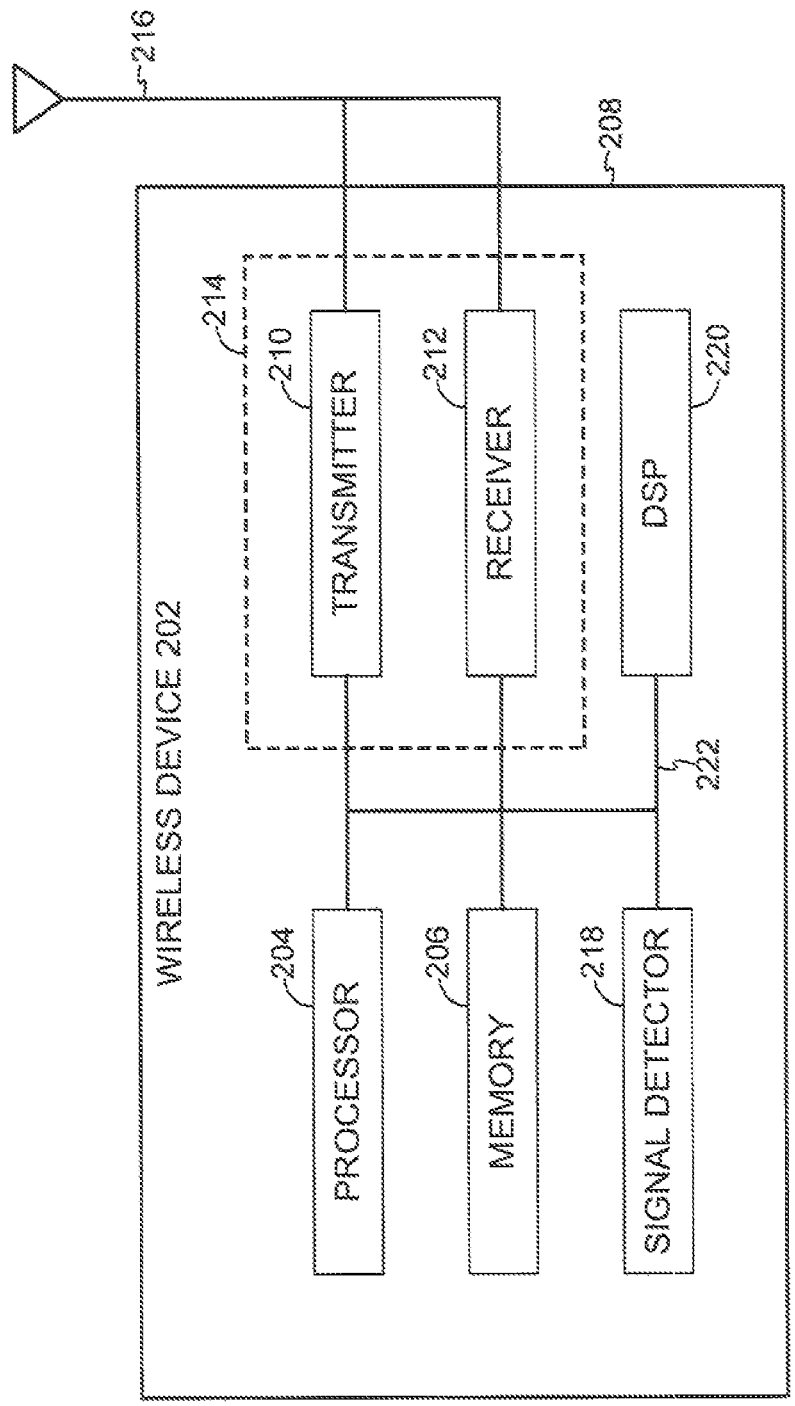
FIG. 2 illustrates various components that may be utilized in a wireless device in accordance with certain aspects of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be the PNC 1E or a terminal 102 in the Piconet 1.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
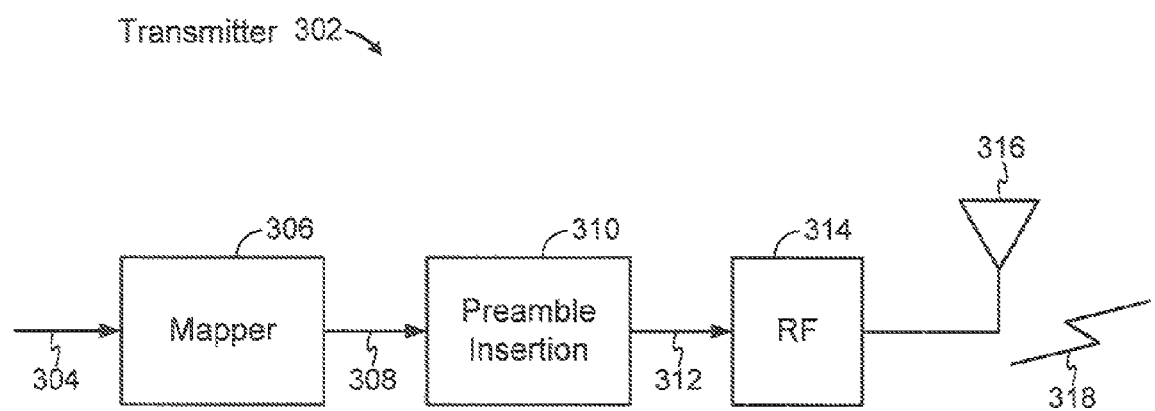
FIG. 3 illustrates an example transmitter that may be used within a wireless communication system in accordance with certain aspects of the present disclosure.

FIG. 3 illustrates an example of a transmitter 302 that may be used within a wireless communication system 100 that utilizes single-carrier or some other transmission technique. Portions of the transmitter 302 may be implemented in the transmitter 210 of a wireless device 202. The transmitter 302 may be implemented in the PNC 1E for transmitting data 304 to a terminal 102. The transmitter 302 may also be implemented in a terminal 102 for transmitting data 304 to the PNC 1E.

Data 304 to be transmitted are shown being provided as input to a mapper 306. The mapper 306 may map the data stream 304 onto constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 306 may output a symbol stream 308, which may represents an input into a preamble insertion unit 310.

The preamble insertion unit 310 may be configured for inserting a preamble sequence at the beginning of the input symbol stream 308, and generates a corresponding data stream 312. The preamble may be known at the receiver and may be utilized for time and frequency synchronization, channel estimation, equalization and channel decoding. The output 312 of the preamble insertion unit 310 may then be up-converted to a desired transmit frequency band by a radio frequency (RF) front end 314. An antenna 316 may then transmit a resulting signal 318 over a wireless channel.

Figure 4:
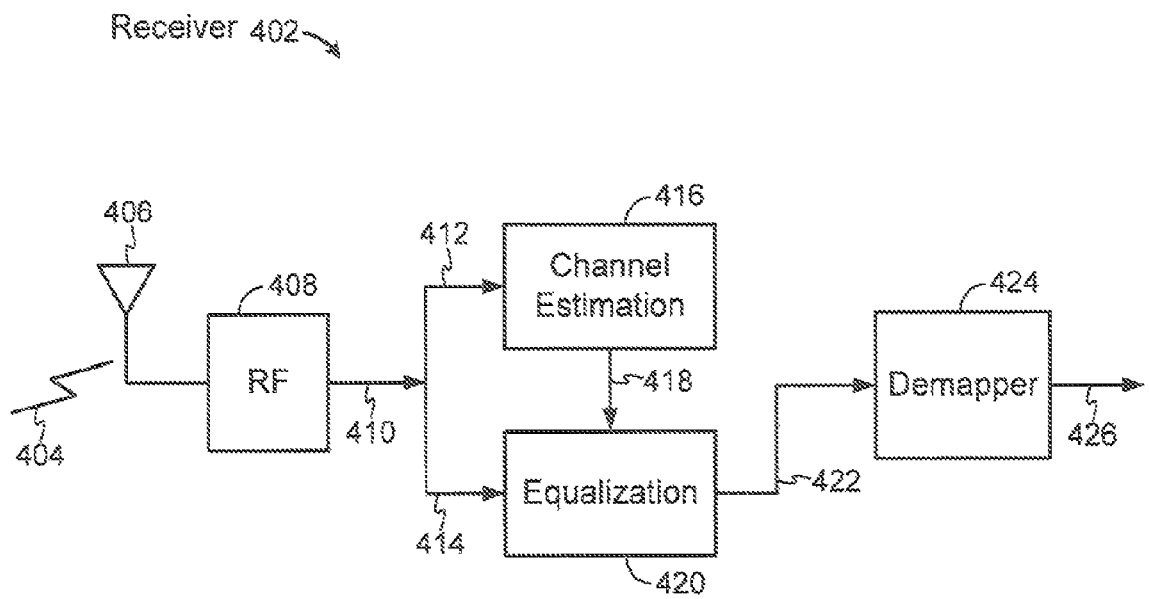
FIG. 4 illustrates an example receiver that may be used within a wireless communication system in accordance with certain aspects of the present disclosure.

FIG. 4 illustrates an example of a receiver 402 that may be used within a wireless device 202 that utilizes a single-carrier or some other transmission technique. Portions of the receiver 402 may be implemented in the receiver 212 of a wireless device 202. The receiver 402 may be implemented in a terminal 102 for receiving data 404 from the PNC 1E. The receiver 402 may also be implemented in the PNC 1E for receiving data 404 from a terminal 102.

When a signal 404 is received by an antenna 406, it may be down-converted to a baseband signal 410 by an RF front end 408. A frame format of the received signal for single-carrier data communications typically comprises a preamble followed by a data portion. A portion of the preamble 412 may be used for channel estimation by unit 416. Received data 414 may be processed by an equalization unit 420 employing previously computed channel estimates 418.

A demapper 424 may input an equalized data stream 422 and may perform the inverse of the symbol mapping operation that was performed by the mapper 306 from FIG. 3 thereby outputting a data stream 426. Ideally, this data stream 426 corresponds to the data 304 that was provided as input to the transmitter 302, as illustrated in FIG. 3.

Association of Device with Network Controller

Figure 5:
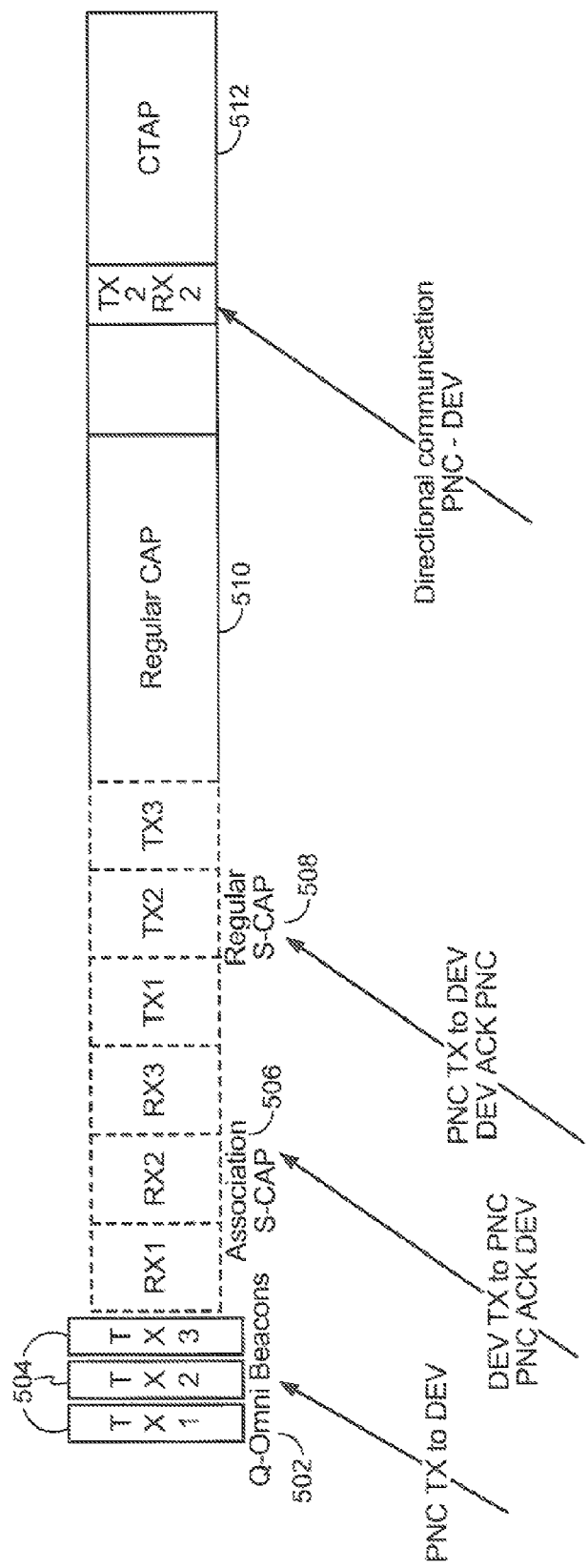
FIG. 5 illustrates an association procedure in accordance with certain aspects of the present disclosure.
Figure 6:
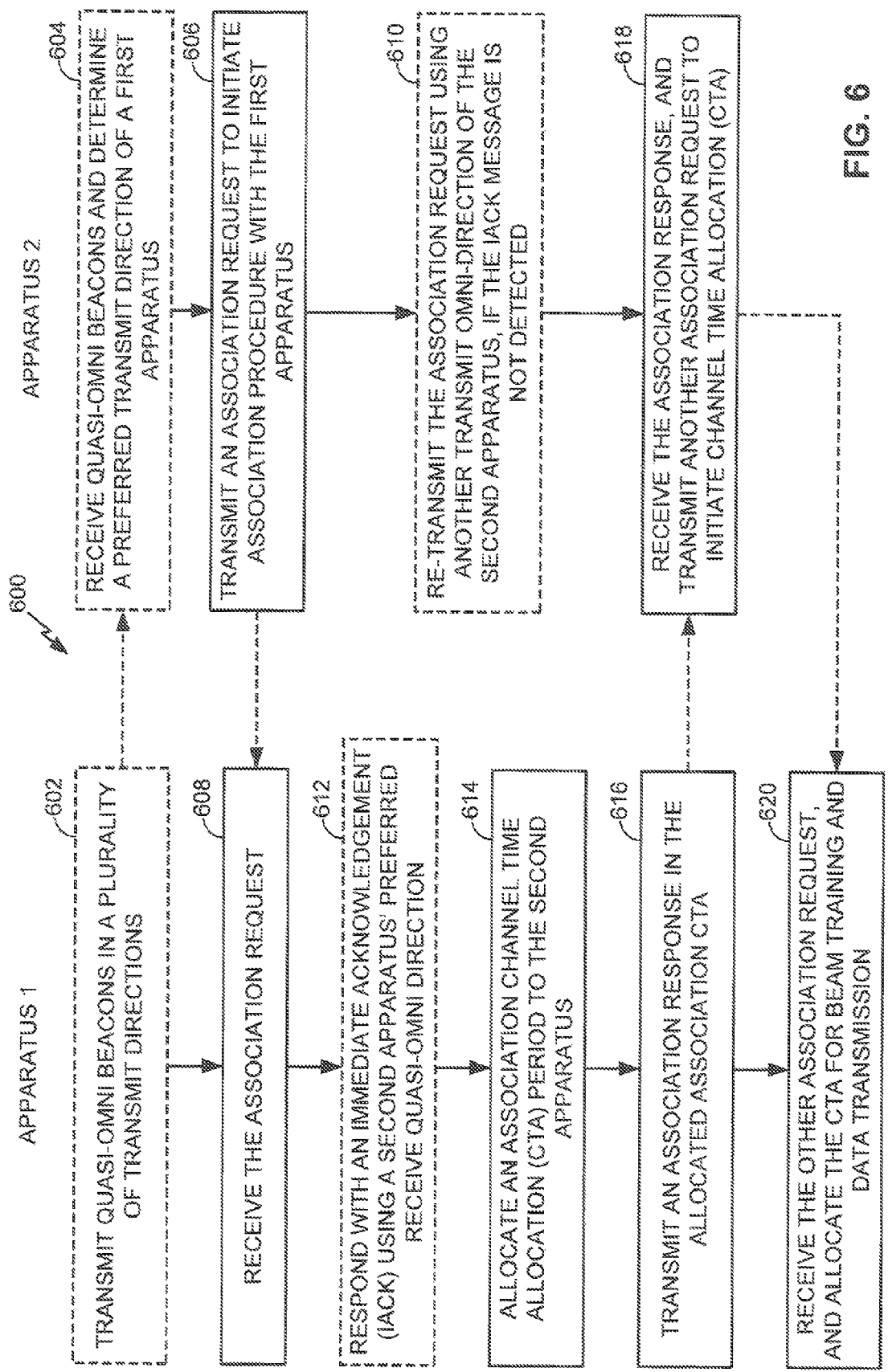
FIG. 6 illustrates example operations for associating a device with a piconet controller in accordance with certain aspects of the present disclosure.

Certain aspects of the present disclosure support an efficient association of an apparatus in a piconet (e.g., a device of the Piconet 100) with another apparatus, e.g., the piconet controller (PNC) 1E from FIG. 1. FIG. 5 illustrates a sample association procedure, and FIG. 6 illustrates example operations 600 for associating a second apparatus (e.g., a device of a piconet) with a first apparatus (e.g., a PNC of the same piconet) in accordance with certain aspects of the present disclosure.

At 602, the first apparatus may transmit quasi-omni beacons 502 in a plurality of transmit directions 504 of the first apparatus. At 604, the second apparatus may receive the quasi-omni beacons 502, and may determine a preferred transmit direction of the first apparatus. At 606, the second apparatus may send Association Request Command (CMD) frames in any of association sub-contention access periods (S-CAPs) 506 using one of transmit omni-directions of the second apparatus. Each Association Request may be sent with an Immediate Acknowledgement (IACK) mode. The Association Request may also include information about a preferred receive quasi-omni direction of the second apparatus.

At 608, the first apparatus may receive the previously transmitted Association Request CMD frames, and may respond, at 612, with an IACK message to a first Association Request detected in the association S-CAP 506 using the preferred receive quasi-omni direction of the second apparatus. If the second apparatus does not receive the IACK, then the second apparatus may resend, at 610, Association Request CMD frames using another transmit omni-direction of the second apparatus. The second apparatus may also apply back-off after each Association Request in the association S-CAP 506.

Once a management entity (DME) provides Association Response information to the first apparatus, the first apparatus may include a second apparatus' Association Response Indication in quasi-omni beacon transmitted to the second apparatus, and may allocate, at 614, an association channel time allocation (CTA) for the second apparatus to complete association with the first apparatus. At 616, the first apparatus may send an Association Response message in the allocated association CTA. The Association Response may include information about a preferred receive quasi-omni direction of the first apparatus.

At 618, the second apparatus may receive the Association Response, and may send another Association Request CMD frame in a preferred direction Association S-CAP. At 620, the first apparatus may receive the other Association Request CMD frame, and may allocate a channel time allocation period (CTAP) 512 for beam training and for data transmission. A regular contention access period (CAP) 510 may be used for a directional communication between peers (i.e., between devices of the piconet), and the CTAP 512 may be utilized for directional communication between the first apparatus (e.g., the PNC) and the second apparatus (e.g., the device), as illustrated in FIG. 5. It should be also noted that the second apparatus may send an announce CMD to the first apparatus over one association S-CAP, and the first apparatus may always allocate the CTA to communicate with the second apparatus.

Figure 7:
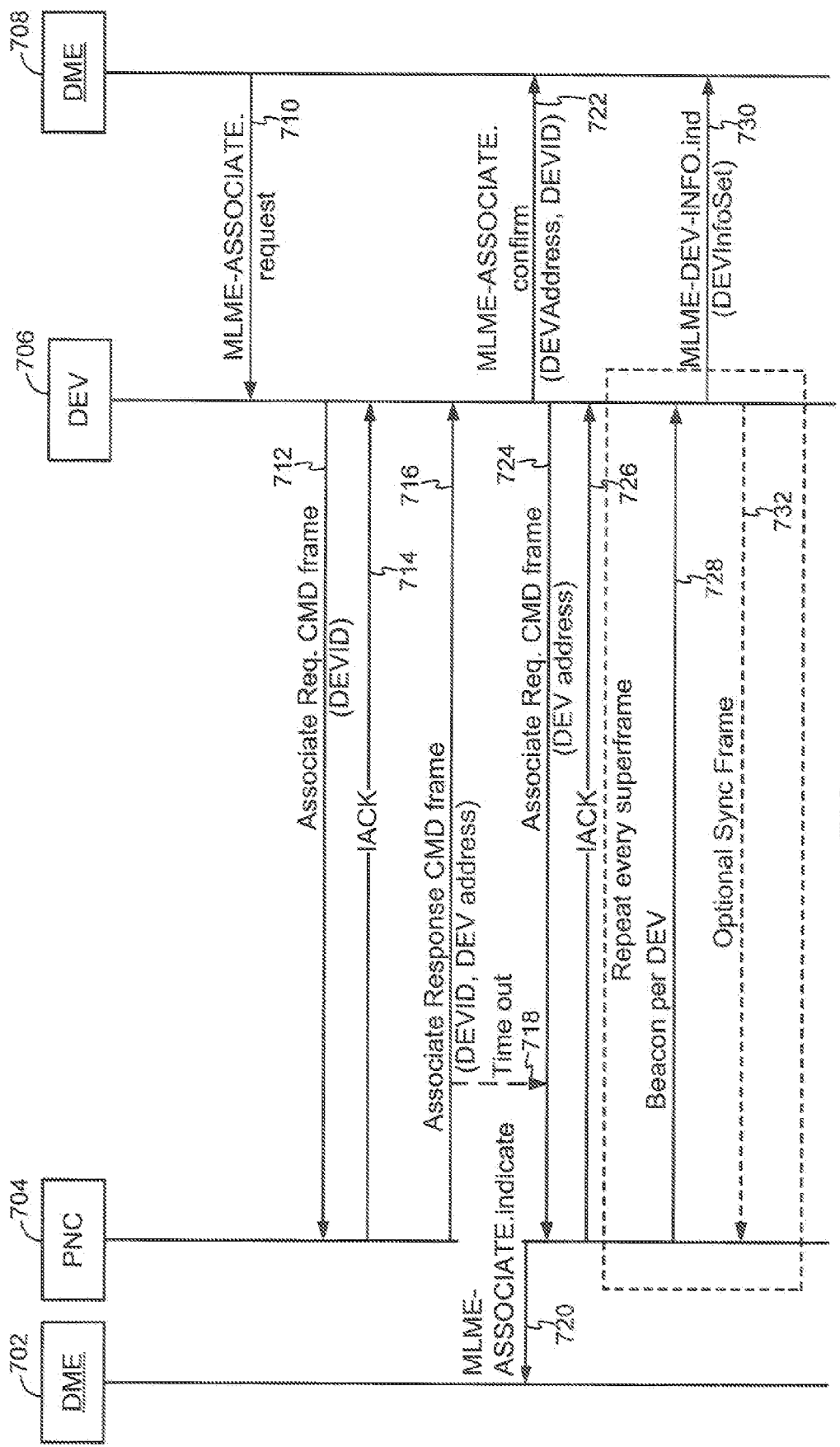
FIG. 7 illustrates an example of association flow in accordance with certain aspects of the present disclosure.

FIG. 7 illustrates an example of association flow in accordance with certain aspects of the present disclosure. A DME 708 may send a MLME-ASSOCIATE.request (MLME: Media Access Control Sub-layer Management Entity) message 710 to a device (DEV) 706 to initiate DEV's association with a PNC 704. The DEV 706 may then transmit an Association Request CMD frame 712 to the PNC 704. The Association Request CMD frame 712, sent in a regular S-CAP, may comprise an identification of the DEV (i.e., DEVID), as illustrated in FIG. 7. When the Association Request CMD frame 712 is detected, the PNC 704 may respond to the DEV with an IACK message 714. After that, the PNC 704 may send to the DEV 706 an Associate Response CMD frame 716 to allocate an association CTA for the DEV to complete association with the PNC. The Associate Response CMD frame 716 may comprise DEV's ID and DEV's address, as illustrated in FIG. 7.

Before a time-out period 718 elapses, the DEV 706 may send to the PNC 704 a second Association Request CMD frame 724 with DEV's address. In the meantime, the PNC 704 may indicate to a DME 702 association with the DEV 706 by sending a MLME-ASSOCIATE.indicate message 720, and the DEV 706 may confirm association with the PNC 704 by sending a MLME-ASSOCIATE.confirm message 722 to the DME 708. The MLME-ASSOCIATE.confirm message 722 may comprise DEV's address and DEV's ID, as illustrated in FIG. 7.

The PNC 704 may respond to the detected Association Request CMD frame 724 with an IACK message 726, and may allocate a channel time allocation period (CTAP) for beam training and data transmission. The PNC may transmit a beacon 728 to the DEV over the allocated CTAP, and the DEV may send to the DME 708 a MLME-DEV-INFO.ind massage 730 indicating a DEV's information set. An optional SYNC frame 732 may be also transmitted from the DEV to the PNC. The sequence of messages 728-732 may be repeated for every super-frame, as illustrated in FIG. 7.

Figure 8:
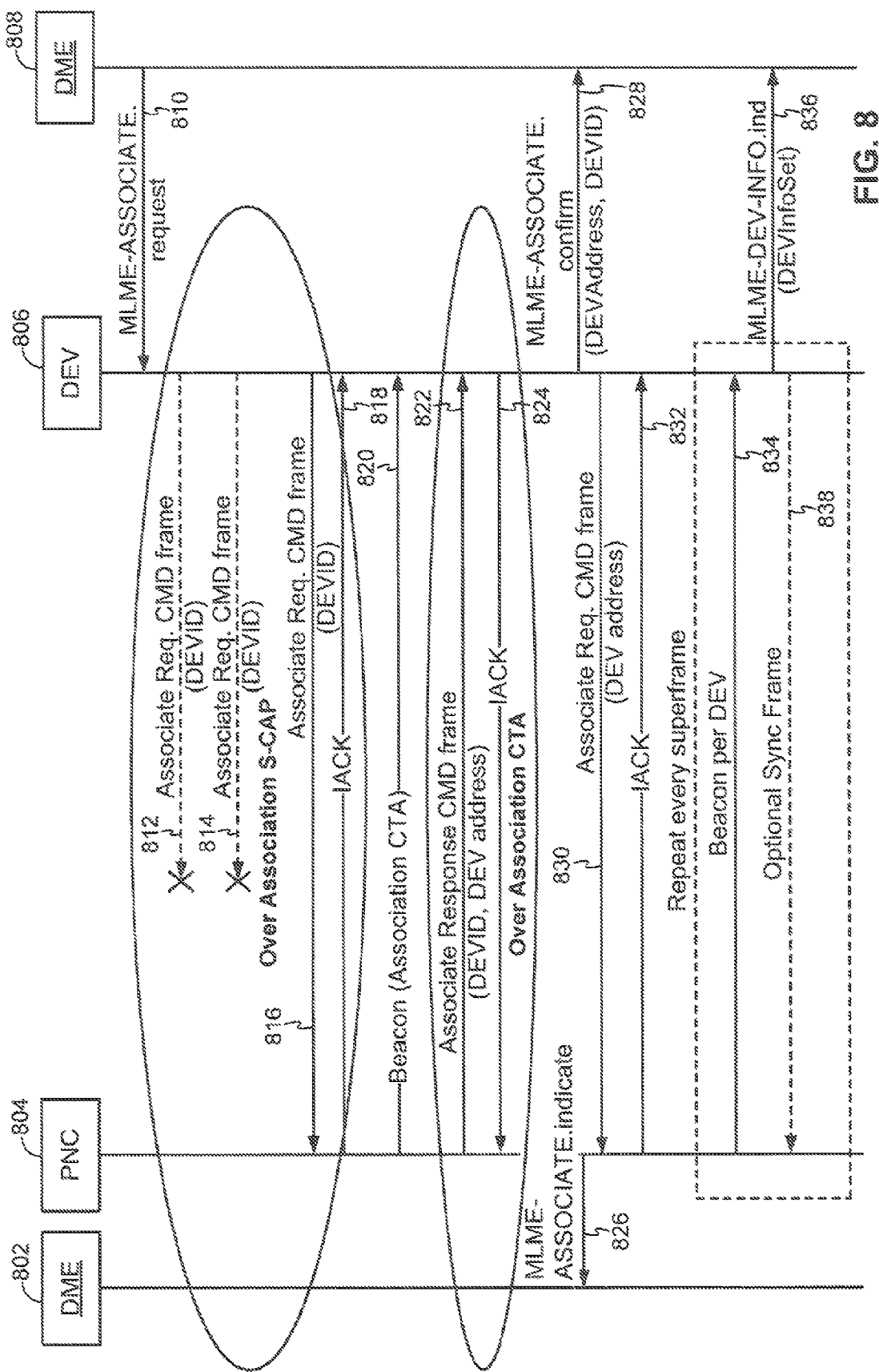
FIG. 8 illustrates another example of association flow in accordance with certain aspects of the present disclosure.

FIG. 8 illustrates another example of association flow in accordance with certain aspects of the present disclosure. A DME 808 may send a MLME-ASSOCIATE.request message 810 to a DEV 806 to initiate DEV's association with a PNC 804. As illustrated in FIG. 8, Association Request CMD frames 812 and 814 may be sent from the DEV 806 to the PNC 804, but the PNC may not be able to detect these frames. Upon detection at the PNC 804 of an Association Request CMD frame 816 that comprises DEV's ID, the PNC may respond to the DEV with an IACK message 818. All transmissions 812-818 may be performed over an association S-CAP, as illustrated in FIG. 8.

The PNC may allocate an association CTA for the DEV 806 to complete the DEV's association by transmitting a beacon 820. The PNC may include DEV's ID and DEV's address into an Associate Response CMD frame 822 sent to the DEV over the allocated association CTA. Upon detection of this frame, the DEV 806 may respond to the PNC with an IACK message 824 also transmitted over the allocated association CTA.

Following the IACK message 824, the PNC 804 may indicate to a DME 802 association with the DEV by sending a MLME-ASSOCIATE.indicate message 826, and the DEV 806 may confirm the association with the PNC by sending a MLME-ASSOCIATE.confirm message 828 to the DME 808. The MLME-ASSOCIATE.confirm message 828 may comprise the DEV's address and DEV's ID, as illustrated in FIG. 8. Then, the DEV 806 may send to the PNC 804 a second Association Request CMD frame 830 with the DEV's address. The PNC 804 may respond to the detected Association Request CMD frame 830 with an IACK message 832, and then the PNC may allocate the CTAP for beam training and for data transmission. The transmissions 830 and 832 may be performed over a preferred direction association S-CAP.

The PNC may transmit a beacon 834 to the DEV over the allocated CTAP, and the DEV may send to the DME 808 a MLME-DEV-INFO.ind massage 836 indicating an information set of the DEV. An optional SYNC frame 838 may be also transmitted from the DEV to the PNC. The sequence of messages 834-838 may be repeated for every super-frame, as illustrated in FIG. 8.

Medium Allocation for Devices in the Network

One example of a media access control (MAC) is the use of a synchronized system where all devices (DEVs) within a single network (such as a piconet or a basic service set (BSS) network) may be synchronized to a common clock. A synchronization frame may be sent in every super-frame and may contain necessary information for time synchronization of DEVs in the network. Each DEV in the network may use a time stamp in the synchronization frame to reset its super-frame clock to zero at the beginning of the super-frame.

If a network controller (i.e., a piconet controller (PNC) or an access point (AP)) is responsible to allocate a medium for devices in the network, then the network controller may request the medium using various methods of command frame transmission in defined time slots within the super-frame (i.e., beacon period). Such allocation may be a fixed reservation, such as a channel time allocation (CTA) for the IEEE 802.15.3c standard, or a distributed reservation protocol (DRP) for the European Computer Manufacturer's Association (ECMA) standard. Allocation of the medium may be also semi-flexible where multiple devices may compete over the medium, while directional transmission may not be allowed (i.e., restricted to low rate omni-directional traffic) or may be predefined (i.e., a sectored or a directional CAP).

Channel time allocations (CTAs) may provide the best Quality of Service (QoS) for connections in the IEEE 802.15.3c system, but potentially CTAs may also cause coexistence problems due to hidden nodes and the presence of other networks such as the IEEE 802.11ad network. This may be because once a DEV owns a CTA, then the DEV may perform transmission without using a listen-before-talk mechanism. Therefore, in an environment where multiple physical layer (PHY) modes co-exist, the self-healing contention access mechanism may provide improved channel utilization. However, due to the directional nature of the millimeter-wave transmission supported by the IEEE 802.15.3c standard, new rules need to be introduced to allow for directional communication in the CAP.

Certain aspects of the present disclosure relate to a method for allowing a directional ad-hoc peer-to-peer communication within the network 100 illustrated in FIG. 1 without any involvement of a network coordinator (such as the PNC 1E or any access point) for medium access allocation. The peer-to-peer communication may also support antenna-pattern training and beamforming (i.e., pro-active beamforming).

Procedures for Accessing the Medium in Contention Access Period

A basic medium access mechanism during a CAP may be based on a carrier-sense multiple access with collision avoidance (CSMA/CA) approach. In order to minimize collisions, a transmitting DEV may be required to first sense that a medium is idle for a random length of time. The MAC may use clear channel assessment (CCA) capabilities of a PHY to detect whether the channel is busy or idle.

If there is insufficient time remaining in the CAP for the entire frame exchange sequence, then the transmitting DEV may not commence transmission of the frame. The IEEE 802.15.3c DEV may be allowed to transmit one frame at a time with a back-off being applied to every frame that is attempted during the CAP, except for an immediate acknowledgement (Imm-ACK) frame. The IEEE 802.11 DEV may be allowed to transmit one or more frames for the duration of a transmit opportunity period with the back-off being applied to every attempt for obtaining ownership of the medium.

Figure 9:
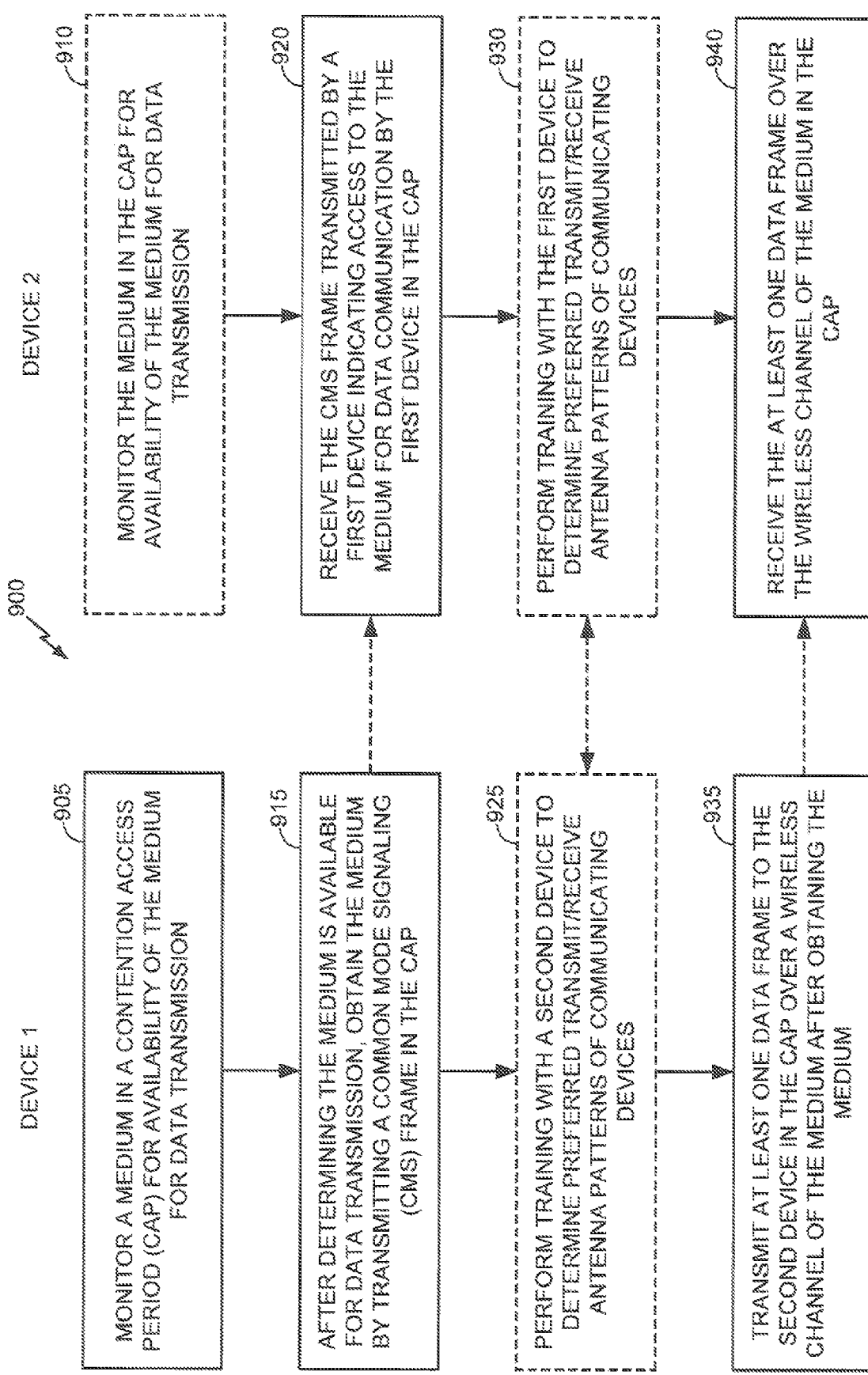
FIG. 9 illustrates example operations for ad-hoc directional transmission in a contention access period (CAP) in accordance with certain aspects of the present disclosure.
Figure 10:
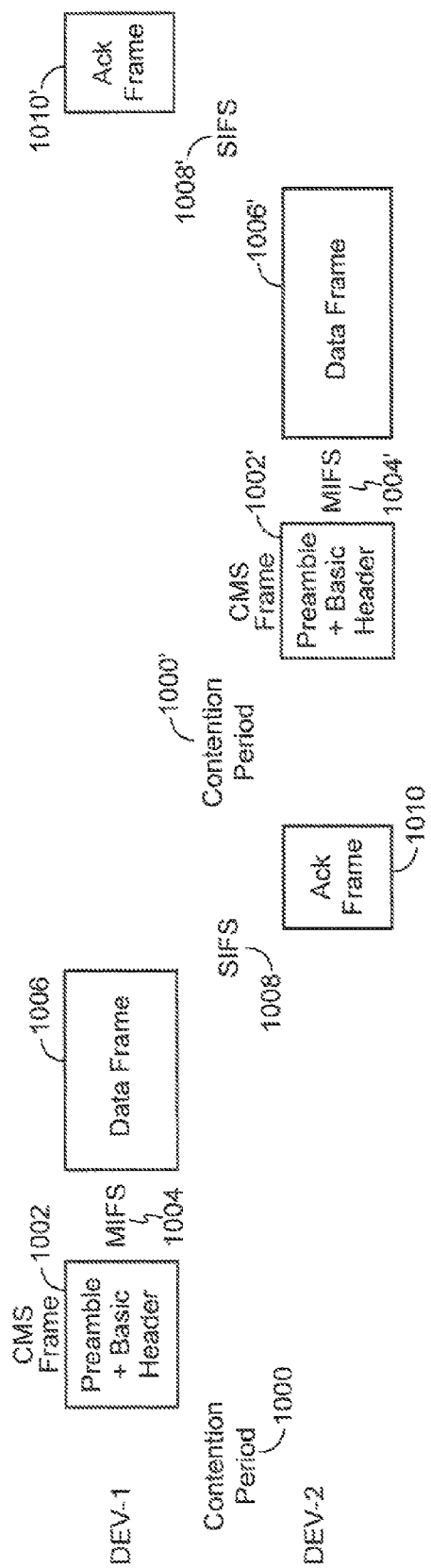
FIG. 10 illustrates an example scenario for ad-hoc directional transmission in the CAP with no antenna-pattern training in accordance with certain aspects of the present disclosure.

FIG. 9 illustrates operations 900 for ad-hoc directional transmission in a CAP with optional training of antenna-patterns (i.e., beamforming) in accordance with certain aspects of the present disclosure. FIG. 10 illustrates an example scenario for the ad-hoc directional transmission in the CAP with no antenna-pattern training.

At 905, the DEV-1 may monitor a medium in the CAP, such as the CAP 1000 illustrated in FIG. 10, for availability of the medium for data transmission by the DEV-1. Also, at 910, the DEV-2 may monitor the medium in the CAP for availability of the medium for data transmission by the DEV-2. At 915, after determining the medium is available for data transmission, the DEV-1 may obtain the medium by transmitting an empty common mode signaling (CMS) frame 1002 in the CAP. At 920, the DEV-2 may receive the empty CMS frame transmitted by the DEV-1 indicating access to the medium for data communication by the DEV-1 in the CAP. The empty CMS frame 1002 may contain only a long preamble and one or more headers, and may be transmitted omni-directionally or quasi omni-directionally.

At 925 and 930, the DEV-1 and the DEV-2 may optionally perform antenna-pattern training (i.e., beamforming) with each other in order to determine preferred transmit and receive antenna patterns (i.e., sector or beam patterns) of the DEV-1 and the DEV-2. Following the empty CMS frame and optional antenna-pattern training (i.e., beamforming), the DEV-1 may be allowed (after a minimum inter-frame space (MIFS) 1004) to send, at 935, the data frame 1006 in any modulation coding scheme (MCS) supported by the CAP PHY mode using a known preferred transmit antenna pattern. A DEV of the IEEE 802.11ad system may be allowed to send one or more data frames in any MCS supported by the CAP PHY mode for a remaining duration of a transmit opportunity period. At 940, the DEV-2 may receive the data frame 1006 transmitted in the CAP from the DEV-1. After a short inter-frame space (SIFS) 1008, the DEV-1 may receive an acknowledgement frame 1010 transmitted from the DEV-2, which confirms successful reception of the data frame 1006 at the DEV-2.

It may be assumed that the preferred transmit pattern of the DEV-1 is known as a result of previously performed beamforming. Therefore, the DEV-1 may use the preferred transmit pattern (i.e., sector or beam) toward the DEV-2 for transmitting the data frame 1006, at 935.

In order to allow for better efficiency in the CAP specified by the IEEE 802.15.3c standard and since the back-off is being applied to every frame attempted during the CAP, it may be desirable to allow for standard aggregation of data frames within the CAP.

As illustrated in FIG. 9, the DEV-1 may optionally train the DEV-2 using a beamforming protocol with at least one level of antenna-pattern training. For certain aspects of the present disclosure, if the DEV-1 failed to obtain the preferred transmit pattern, then the DEV-1 may not commence transmission and may apply back-off before attempting to re-gain the medium.

For standards which allow bi-directional traffic within the transmit opportunity period and for standards which allow transmission of multiple data frames within the transmit opportunity period, the proposed medium access procedure in the CAP may be expanded to include a single CMS frame and an optional training sequence per DEV per transmit opportunity period. The CMS frame may be also a vanguard CMS frame, which may be transmitted from the DEV when the medium for data transmission in the CAP is obtained for the first time. The vanguard CMS frame may be employed for training of antenna patterns used for future communication.

Figure 11:
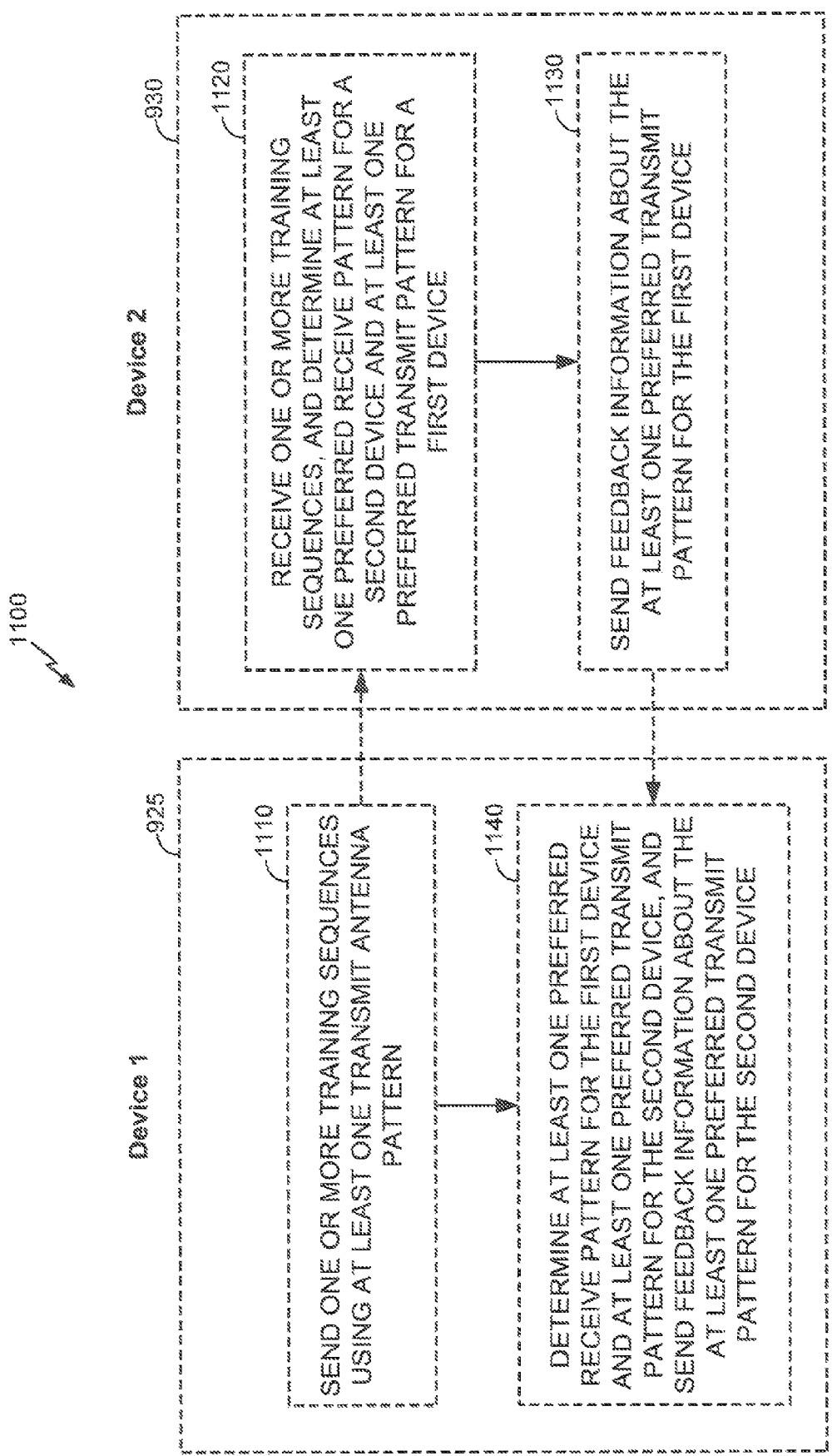
FIG. 11 illustrates example operations for antenna-pattern training as a part of the ad-hoc directional transmission illustrated in FIG. 9 in accordance with certain aspects of the present disclosure.
Figure 12:
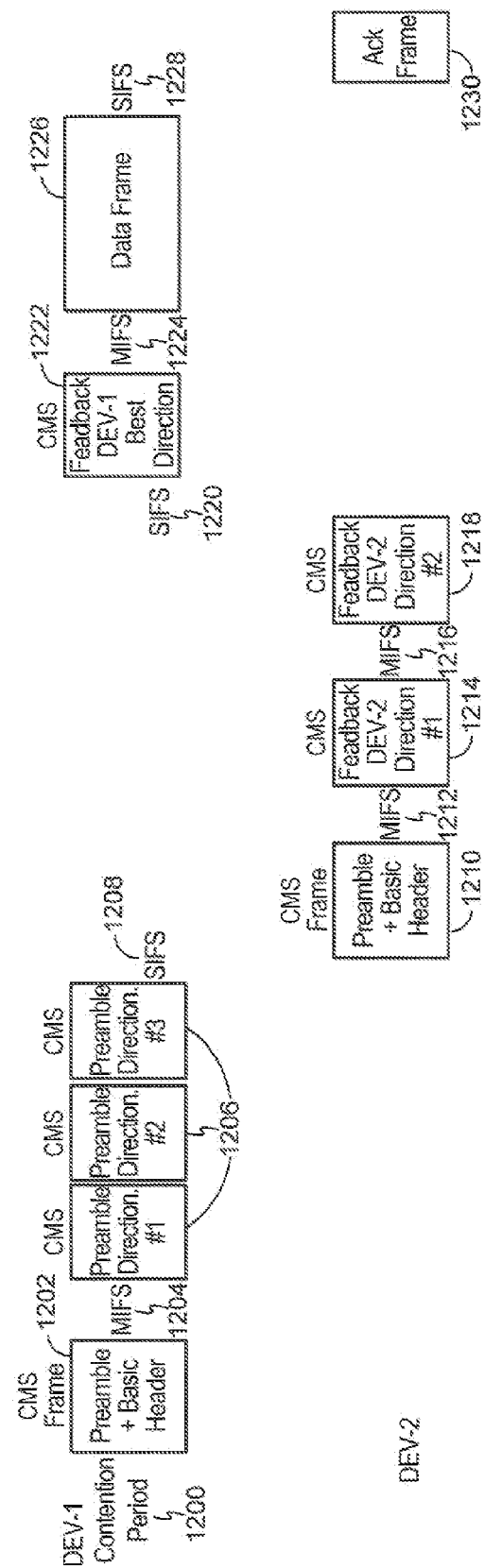
FIG. 12 illustrates an example scenario for ad-hoc directional transmission in the CAP with antenna-pattern training in accordance with certain aspects of the present disclosure.

FIG. 11 illustrates example operations 1100 for antenna-pattern training, which may be included as steps 925 and 930 in operations 900 for the ad-hoc directional transmission illustrated in FIG. 9. FIG. 12 illustrates an example scenario for the ad-hoc directional transmission in the CAP with antenna-pattern training (i.e., beamforming) between two communicating devices. At 1110, the DEV-1 may perform beamforming with the DEV-2 by sending training sequences 1206 using at least one transmit antenna pattern. Before sending the training sequences, the DEV-1 may set a beam tracking bit in a PHY header of the transmitted empty CMS frame 1202 to '1' in order to request beamforming with the other DEV (i.e., the DEV-2 illustrated in FIG. 12).

At 1120, the DEV-2 may receive the training sequences 1206 transmitted from the DEV-1 using a plurality of receive antenna patterns. The DEV-2 may determine at least one preferred receive antenna pattern of the DEV-2 and at least one preferred transmit antenna pattern of the DEV-1. Following a short inter-frame space 1208, the DEV-2 may send a CMS frame 1210 in order to access the medium in the CAP.

At 1130, following a minimum inter-frame space (MIFS) 1212, the DEV-2 may send to the DEV-1 feedback information 1214 about a first preferred transmit antenna pattern of the DEV-1 chosen from the at least one preferred transmit antenna pattern of the DEV-1. The feedback information 1214 may be transmitted using all available transmit antenna directions of the DEV-2. Optionally, the DEV-2 may send to the DEV-1 feedback information 1218 about a second preferred transmit pattern of the DEV-1. The DEV-1 may sweep its receive antenna patterns during reception of the feedback information 1214 transmitted from the DEV-2.

At 1140, following a SIFS 1220, the DEV-1 may determine at least one preferred receive antenna pattern of the DEV-1 and at least one preferred transmit antenna pattern of the DEV-2, and may send feedback information 1222 to the DEV-2 about the at least one preferred transmit antenna pattern of the DEV-2. After a MIFS 1224, the DEV-1 may send a data frame 1226 using the first preferred transmit antenna pattern of the DEV-1 in any MCS supported by the CAP PHY mode. The transmitted data frame 1226 may be received at the DEV-2 using a preferred receive antenna pattern chosen from the at least one preferred receive antenna pattern of the DEV-2. Following a SIFS 1228, the DEV-2 may send back to the DEV-1 an acknowledgement frame 1230 using a preferred transmit antenna pattern chosen from the at least one preferred transmit antenna pattern.

In a Symmetric Antenna System (SAS), there may be no need for sending feedback information during training of antenna directions. Therefore, each DEV in the SAS may train its peers by sending only repetitions of training sequence in every antenna direction. In the above description of antenna-pattern training, each DEV (i.e., the DEV-1 and the DEV-2) may send a training sequence following an empty CMS frame, and each DEV may then transmit data frames in a transmit antenna direction that may be previously determined to be a preferred receive antenna direction.

CMS Frame Format and Channel Sensing

Figure 13:
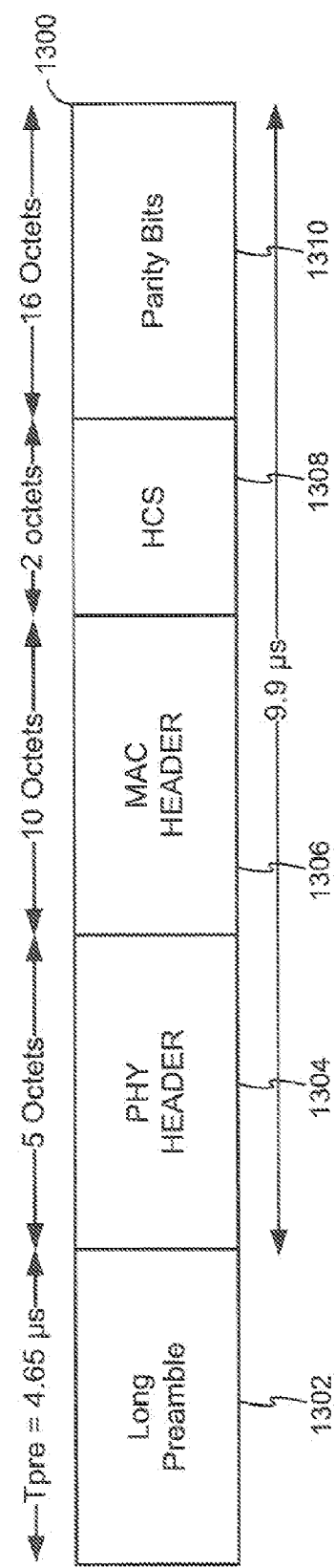
FIG. 13 illustrates an example of an empty common mode signaling (CMS) frame in accordance with certain aspects of the present disclosure.

Each device in the IEEE 802.15.3c system may be required to send an empty CMS frame when trying to obtain medium access for transmitting data in a PHY mode other than CMS. The empty CMS frame may be transmitted either omni-directionally or quasi omni-directionally. As illustrated in FIG. 13, the empty CMS frame 1300 may comprise a Long preamble 1302, a PHY header 1304, a MAC header 1306, a header check sum (HCS) 1308, and parity bits 1310.

FIG. 14 illustrates a structure of the PHY header 1304 from the CMS frame 1300 in accordance with certain aspects of the present disclosure. The PHY header 1304 may comprise: a scrambler seed identifier (ID) field 1402, an aggregation bit 1404, an unequal error protection (UEP) bit 1406, a modulation coding scheme (MCS) field 1408, a frame length field 1410, a preamble type field 1412, a beam tracking bit 1414, a low latency mode bit 1416, a pilot word length bit 1418, a periodic channel estimation sequence (PCES) bit 1420, and a reserved field 1422.

All fields of the PHY header 1304 of the empty CMS frame 1300 may be fixed, except the beam tracking bit 1414. The beam tracking bit 1414 may be set to '1' if training sequences for beam tracking follow the current CMS frame 1300, and may be set to zero otherwise. The frame length field 1410 may be an unsigned integer that indicates the number of octets of the MAC frame body excluding a frame check sequence (FCS) field. The frame length field 1410 may be set to zero in the empty CMS frame 1300 or may indicate duration of following one or more data frames.

The aggregation bit 1404 of the PHY header 1304 may be set to zero, and the UEP bit 1406 may be also set to zero. The MCS field 1408 may be set to 0b00000. The preamble type field 1412 may be set to 0b00. The low latency mode bit 1416 may be set to zero, the pilot word length bit 1418 may be set to zero, and the PCES bit 1420 may be set to zero.

FIG. 15 illustrates a structure of the MAC header 1306 of the empty CMS frame 1300 illustrated in FIG. 13 in accordance with certain aspects of the present disclosure. The MAC header 1306 may comprise: a frame control field 1502, a piconet identification (PNID) field 1504, a destination ID (DestID) field 1506, a source ID field (SrcID) 1508, a fragmentation control field 1510, and a stream index field 1512.

A DEV that listens to the medium may obtain peer information (i.e., the source ID, the destination ID and the stream index) from the MAC header previously transmitted from another DEV. Based on the information from the MAC header, the listening DEV may decide either to keep its receiver open for one or more optional training sequences and/or a following data frame, or to switch to a listening mode since a transmitting DEV may not be any of its peers and/or the listening DEV may not be the transmission destination.

In order to allow better efficiency in the CAP and since the back-off may be applied to every frame attempted during the CAP, certain aspects of the present disclosure support utilization of unidirectional standard aggregation data frames in the CAP. Certain aspects of the present disclosure support removing restriction of an ACK policy to an 1 mm-ACK frame and to a No-ACK (i.e., negative acknowledgement) frame, and also allow for a block ACK frame.

The IEEE 802.15.3 piconet networks may use the carrier-sense multiple access with collision avoidance (CSMA/CA) scheme during the CAP and time division multiple access (TDMA) during a channel time allocation period (CTAP). The CAP may provide efficient method of coexistence with other networks, including the IEEE 802.11 networks, since the CSMA/CA algorithm used in the CAP may be similar to the CSMA/CA algorithm used in the IEEE 802.11 networks, i.e. a transmitter may use a listen-before-talk mechanism.

A clear channel assessment (CCA) mechanism in the CAP of the current IEEE 802.15.3 system may not be robust enough to support directional transmission, which may lead to a considerable waste of power and poor co-existence. Certain aspects of the present disclosure support a modified CCA mechanism that may allow directional transmission in the CAP.

The PHY of the IEEE 802.15.3 system may require energy detection as a part of the CCA process. A sufficiently strong signal may result in a DEV signaling which may indicate that the medium is busy. This may improve the coexistence performance. The omni-directional (or quasi omni-directional)

empty CMS frame may be used during the first part of the CCA (i.e., during listening for the Long preamble).

A start of a valid Long preamble sequence at a receive level equal to or greater than a defined minimum sensitivity may indicate that the medium is busy with a probability greater than 90% within 5 μs. The receiver CCA function may report in all circumstances that the medium is busy with any signal that may be 20 dB above the defined minimum sensitivity for the CMS frame.

If a DEV wishing to initiate transfer detects the Long preamble during its listen-before-talk period (i.e., during a back-off inter-frame space), the DEV may refrain from transmitting and may suspend its back-off counter according to a back-off algorithm. This DEV may also remain in a receive mode during the CMS frame in order to obtain peer information from the MAC header. Based on the obtained peer information, the DEV may decide whether to keep its receiver open for one or more optional training sequences and/or following data frame, or to switch to the listening mode if a transmitting device is not any of DEV's peers and/or DEV is not the transmission destination.

In order to obtain frame duration, the listening DEV may also decide to decode the optional training sequences and the PHY header of the following data frame, even if the listening DEV may not be the transmission destination. The listening DEV may then operate in a sleep mode for the duration of the data frame including an ACK frame in order to save power consumption.

There is no mechanism in the current IEEE 802.15.3c standard, such as a Network Allocation Vector (NAV), to indicate transmission duration in the CAP, i.e., to inform the listening DEV of a medium busy duration. This may lead to considerable waste of power and poor co-existence. Certain aspects of the present disclosure support adding duration indication to the CAP transmission. In one aspect, the fragmentation control field 1510 of the MAC header 1306 of the empty CMS frame 1300 illustrated in FIG. 15 may be reallocated to indicate duration information.

Figure 16:
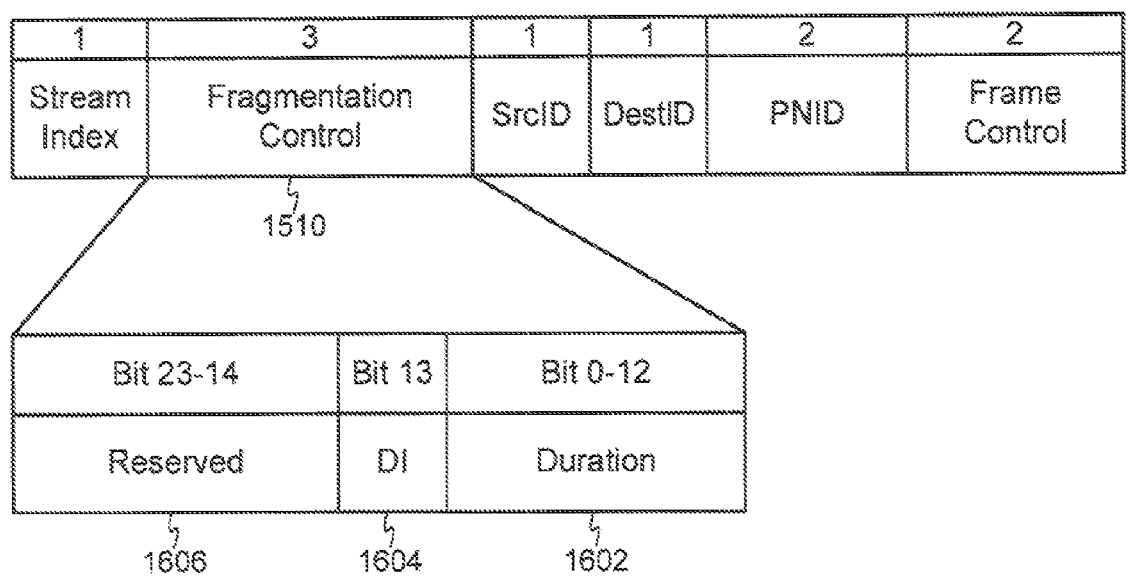
FIG. 16 illustrates a structure of a fragmentation control field of the MAC header in accordance with certain aspects of the present disclosure.

FIG. 16 illustrates a structure of the fragmentation control field 1510 of the MAC header 1306 in accordance with certain aspects of the present disclosure. The fragmentation control field 1510 may comprise a duration field 1602, a duration indication bit 1604, and a reserved field 1606. The Duration Indication (DI) bit 1604 may be set to '1' to indicate that bits 0-12 (i.e., the duration field 1602) may contain duration information. The duration field 1602 may contain the time in microseconds for which the medium is busy. A maximum allocated duration may be 8 ms, which may allow for aggregated data frame of 256 KB, while still maintaining 8% frame error rate (FER) in a highest supported MCS.

Certain aspects of the present disclosure support a requirement that a DEV obtaining the medium for transmitting a data frame in the PHY mode other than CMS may transmit an omni-directional (or quasi omni-directional) CMS command frame before the data frame. This particular command frame may include a new duration information element (IE) in a frame payload.

Figure 17:
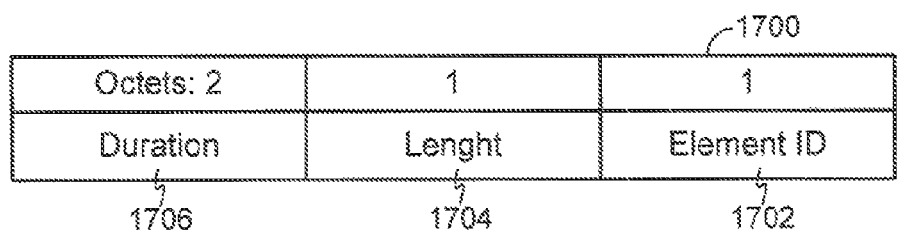
FIG. 17 illustrates a structure of a Duration Information Element (IE) field of the CMS command frame in accordance with certain aspects of the present disclosure.

FIG. 17 illustrates a structure of the new duration IE field 1700 of the CMS command frame in accordance with certain aspects of the present disclosure. The duration IE field 1700 may comprise an element ID field 1702, a length field 1704, and a duration field 1706. The duration field 1706 may contains a time in microseconds for which the medium is busy. A maximum allocated duration may be 8 ms, which may allow for aggregated data frame of 256 KB, while still maintaining 8% frame error rate (FER) in a highest MCS.

Figure 18:
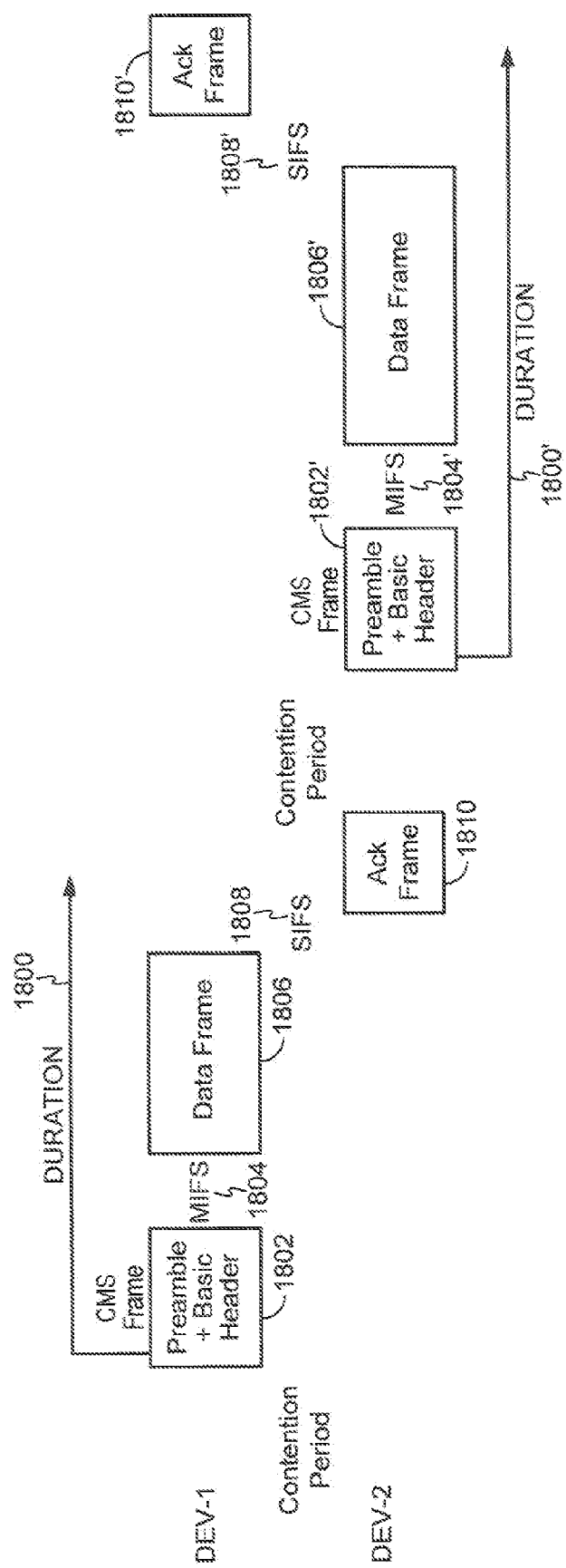
FIG. 18 illustrates an example of busy medium durations in the case of ad-hoc directional transmission without training of antenna patterns in accordance with certain aspects of the present disclosure.

FIG. 18 illustrates an example of durations 1800 and 1800' indicating how long the medium may be busy for an ad-hoc directional transmission with no training in accordance with certain aspects of the present disclosure. For example, the duration 1800 may comprise a cumulative duration of an empty CMS frame 1802, a MIFS 1804, a data frame 1806, a SIFS 1808, and an ACK frame 1810. The duration 1800 may be indicated in the empty CMS frame 1802, while the duration 1800' may be indicated in an empty CMS frame 1802'.

Figure 19:
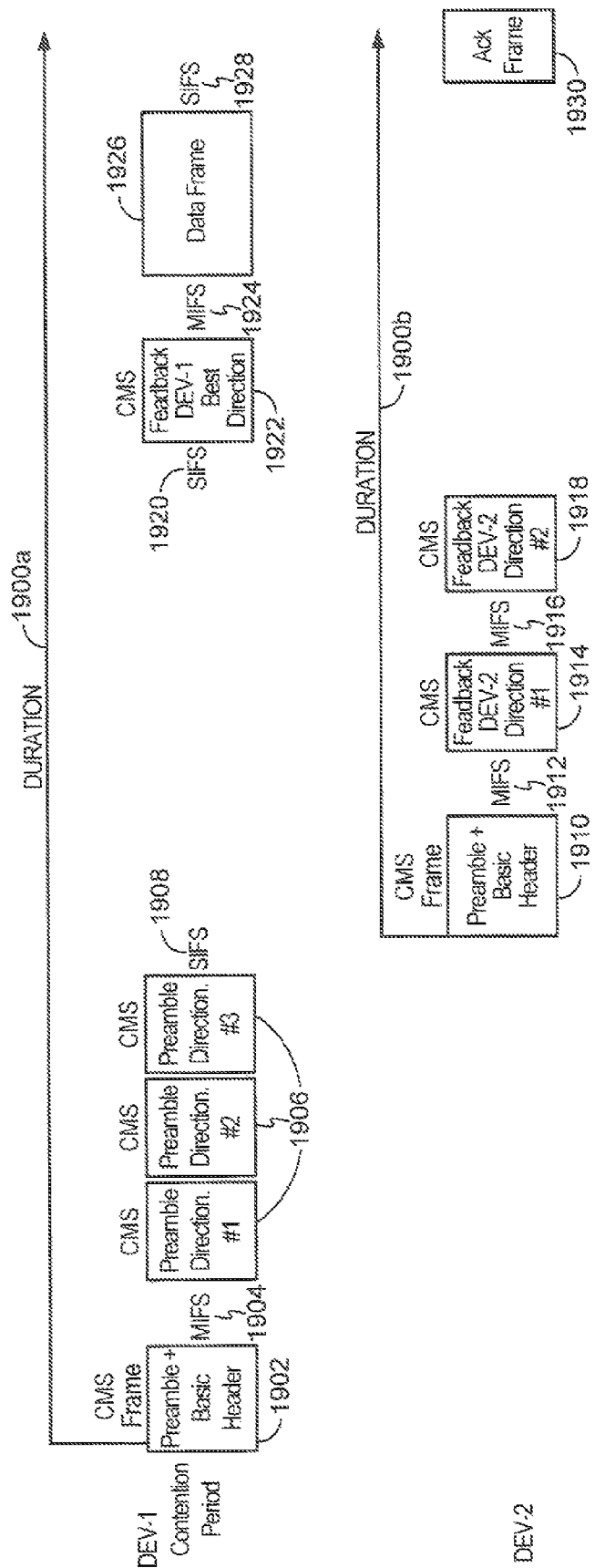
FIG. 19 illustrates an example of busy medium durations in the case of ad-hoc directional transmission with training of antenna patterns in accordance with certain aspects of the present disclosure.

FIG. 19 illustrates an example of durations 1900a and 1900b indicating how long the medium may be busy for an ad-hoc directional transmission with training in accordance with certain aspects of the present disclosure. The duration 1900a may be indicated within an empty CMS frame 1902, while the duration 1900b may be indicated within an empty CMS frame 1910. As illustrated in FIG. 19, the duration period 1900a may comprise a cumulative duration of the empty CMS frame 1902, a MIFS 1904, training sequences 1906, a SIFS 1908, the empty CMS frame 1910, a MIFS 1912, a first feedback information 1914, a MIFS 1916, a second feedback information 1918, a SIFS 1920, a feedback information 1922, a SIFS 1924, a data frame 1926, a SIFS 1928, and an ACK frame 1930. As illustrated in FIG. 19, the duration period 1900b may comprise a cumulative duration of the empty CMS frame 1910, the MIFS 1912, the first feedback information 1914, the MIFS 1916, the second feedback information 1918, the SIFS 1920, the feedback information 1922, the SIFS 1924, the data frame 1926, the SIFS 1928, and the ACK frame 1930.

Transmission Opportunity and Slotted Access

As previously described, the newly proposed access methods may be applied to any contention access protocol, including the IEEE 802.11 and the enhanced distributed channel access (EDCA). This is because the suggested mechanism may define a method for device listening to a medium according to any medium access priority and timing rules in order to obtain and maintain a transmission direction from a vanguard CMS frame headers according to new rules of ad-hoc (i.e. a proactive) beamforming.

This mechanism may be also applied for directional data transfer during a contention-free period (CFP). In this case, a point coordinator (PC) may establish the CFP using a beacon frame. For millimeter-wave PHY, this beacon frame may be transferred using a CMS frame format, and may comply with the previously described rules for ad-hoc (i.e., pro-active) beamforming.

Any data transfer within the CFP may be also performed according to the previously described rules of obtaining and maintaining transmission direction, from a vanguard CMS frame header and optional training sequence in a first transmission from each DEV.

Quasi-Omni Transmission and Reception

A DEV, which may be incapable of transmitting an omni-directional CMS frame and its preferred transmit pattern is unknown, may send the CMS frame in one of its supported transmit directions each time the DEV gains control over the medium.

If the DEV (i.e., the DEV-1) is capable of performing beamforming with another DEV (i.e. a DEV-2), the DEV-1 may set a beam tracking field in a PHY header of the CMS frame to '1'. The DEV-1 may then train the DEV-2 using the beamforming protocol with either one or two levels. In one aspect of the present disclosure, the DEV-1 may use round-robin of supported transmit antenna directions each time the DEV-1 gains control over the medium, while its preferred transmit pattern may be unknown.

A DEV, which may be incapable of transmitting an omni-directional CMS frame and its preferred transmit pattern is known, may use its preferred transmit pattern (i.e., a sector or beam) each time the DEV gains control over the medium.

Figure 20:
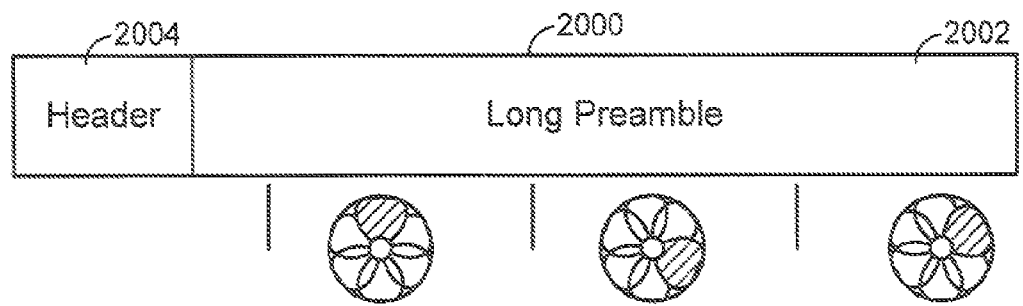
FIG. 20 illustrates an example of quasi-omni preamble reception in accordance with certain aspects of the present disclosure.

FIG. 20 illustrates an example of quasi-omni preamble reception in accordance with certain aspects of the present disclosure. A CMS frame 2000 may be a vanguard CMS frame, which may be transmitted from the DEV when the medium for data transmission in a CAP is obtained for the first time. As illustrated in FIG. 20, a listening device (i.e. DEV-1), which may be not omni-capable, may sweep receive directions every defined period of time (i.e., every CCA detection time period) until the listening device detects the presence of the preamble. The CCA detection time period may be 2 μs for a single carrier/high speed interface (SC/HIS) PHY and 9 μs for an audio-video (AV) PHY.

The sweep may be performed over all receive antenna directions of the DEV-1 or over a set of receive antenna directions suitable for reception from its current peers. Upon detection of a Long preamble 2002 of the CMS frame 2000, the DEV-1 may find a working antenna direction for a particular peer. The DEV-1 may use this working antenna direction until detecting the PHY header 2004. The DEV-1 may detect the PHY header 2004, and then may proceed according the previously defined rules.

Accessing the Medium in Cap Using Long Preamble

Figure 21:
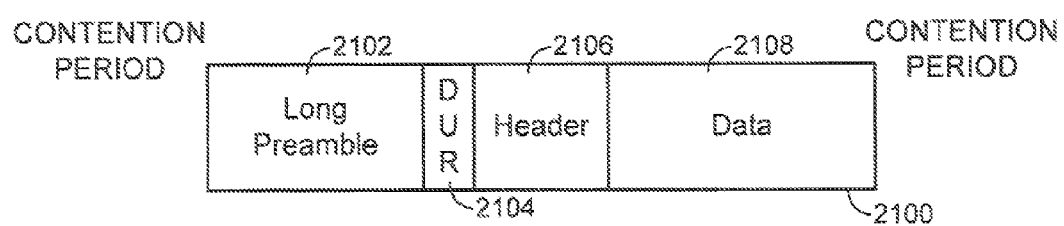
FIG. 21 illustrates a frame structure with long preamble for accessing the medium in the CAP in accordance with certain aspects of the present disclosure.

Certain aspects of the present disclosure support utilizing a long preamble for accessing the medium in a contention access period (CAP). FIG. 21 illustrates a frame structure 2100 with a long preamble 2102 in accordance with certain aspects of the present disclosure. The DEV trying to access the medium in the CAP may send the long preamble 2102 followed by 8-bit Duration field 2104. The long preamble 2102 may be sent according to a single carrier (SC) transmission scheme using a base rate, and may be protected with a Hamming 12'8 code. If the medium is granted, then the DEV may be allowed to send over the regular CAP using its best direction a data packet 2108 along with a header 2106 in any modulation-coding scheme (MCS) supported by the CAP PHY mode.

In certain aspects of the present disclosure, it may be preferable to use a HSI MCS0 (High Speed Interface Modulation Coding Scheme 0)/AV LRP (Audio/Video Low-Rate PHY) preamble sequence for regular CAP transmission, supporting only HSI PHY/AV PHY respectively. Therefore, the long preamble 2102 may comprise the CMS/HIS MSC0/AV LRP preamble sequence. A start of the valid CMS/HIS MSC0/AV LRP preamble sequence at a receive level equal to or greater than a defined minimum sensitivity for the CMS may indicate that the medium is busy with a certain probability, for example, with the probability greater than 90% within approximately 5 μs. The receiver clear channel assessment (CCA) function may report in certain circumstances that the medium is busy with any signal approximately 20 dB above the minimum sensitivity for the CMS/HIS MCS0/AV LRP long preamble sequence.

If a DEV (e.g., DEV-1) wishing to initiate a transfer detects the CMS/HIS MCS0/AV LRP preamble sequence during its listen-before-talk (i.e., during its back-off inter-frame space) period, the DEV-1 may refrain from transmitting and may suspend its back-off counter according to the back-off algorithm. The DEV-1 may also remain in receive mode in order to obtain information about the duration of the frame 2100. After obtaining the duration information, the DEV-1 may go to sleep mode for the duration period equal to the frame transmission (including acknowledgement) in order to save power consumption.

Figure 6A:
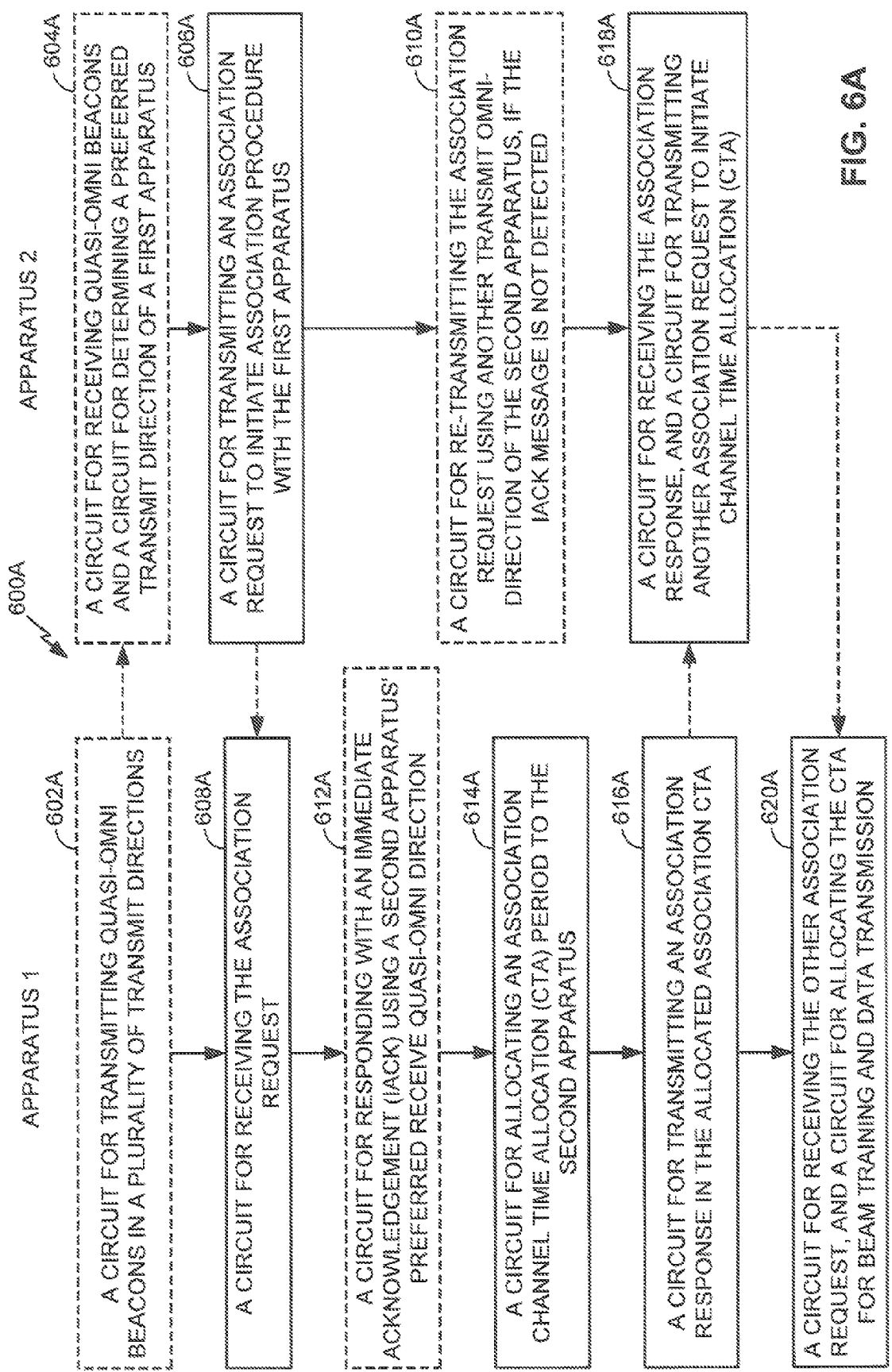
FIG. 6A illustrates example components capable of performing the operations illustrated in FIG. 6.
Figure 9A:
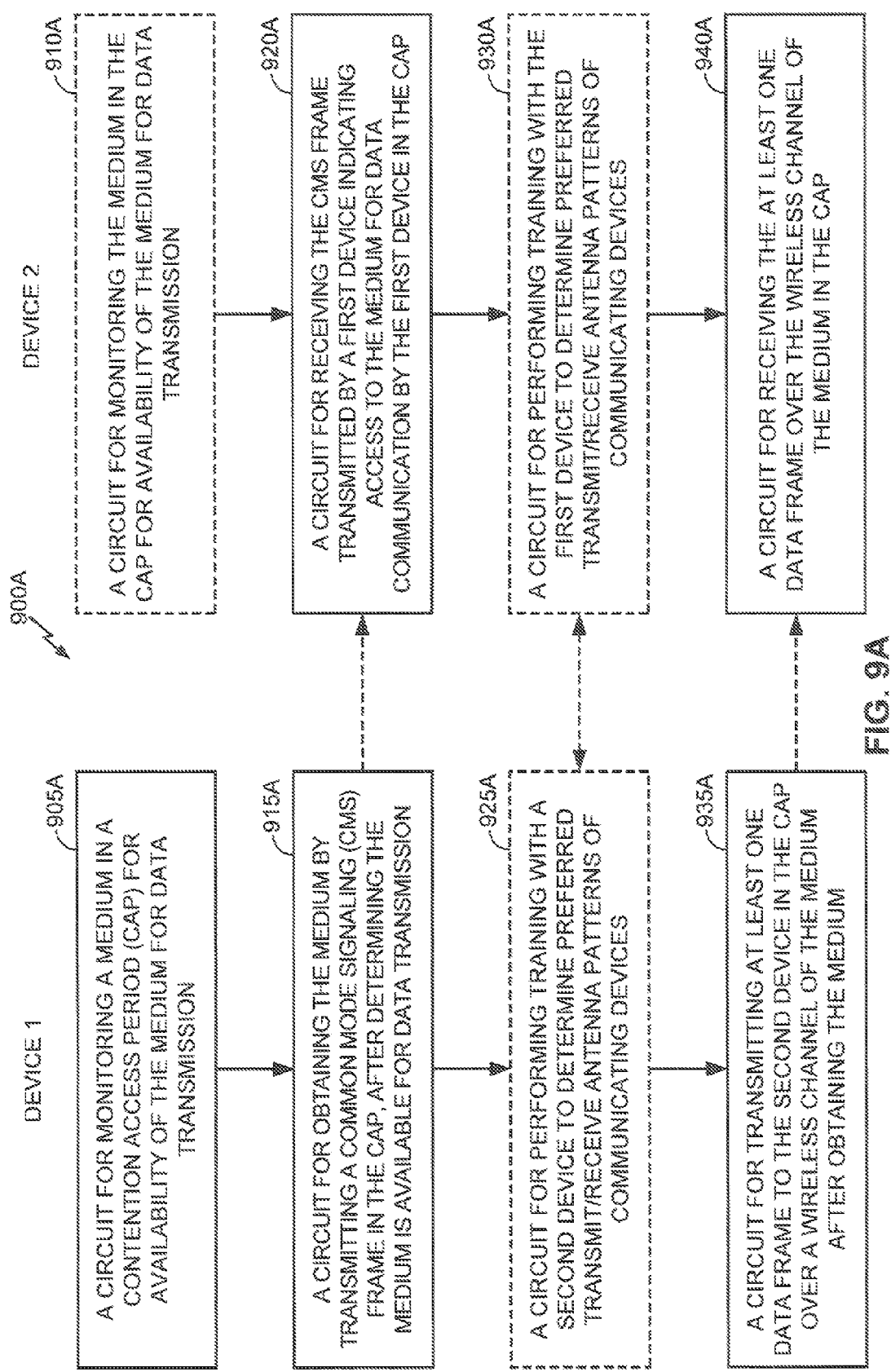
FIG. 9A illustrates example components capable of performing the operations illustrated in FIG. 9.
Figure 11A:
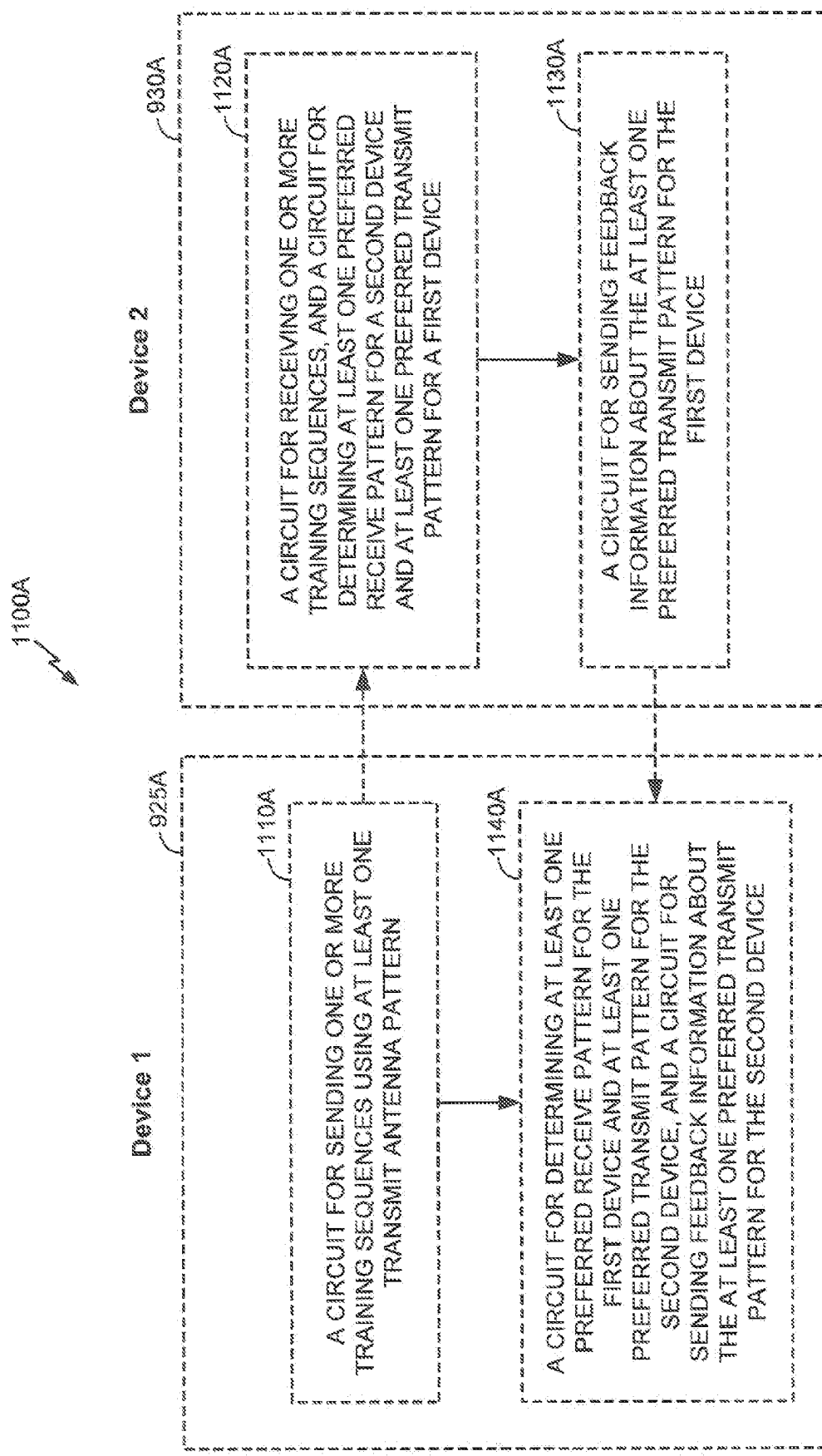
FIG. 11A illustrates example components capable of performing the operations illustrated in FIG. 11.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 602-620, 905-940 and 1110-1140, illustrated in FIGS. 6, 9 and 11 correspond to circuit blocks 602A-620A, 905A-940A and 1110A-1140A illustrated in FIGS. 6A, 9A and 11A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point, an access terminal or other type of wireless device with processing logic and elements to perform the techniques provided herein.

The invention claimed is:

1. A method for wireless communications, comprising:
monitoring, by an apparatus, a medium in a contention access period (CAP) for availability of the medium for data transmission by the apparatus;
after determining the medium is available for data transmission by the apparatus, obtaining the medium by transmitting, from the apparatus, a common mode signaling (CMS) frame in the CAP;
transmitting, from the apparatus, at least one data frame to another apparatus in the CAP over a wireless channel of the medium after obtaining the medium; and
performing training with the other apparatus to identify one or more preferred antenna patterns to use for transmissions over the wireless channel.

2. The method of claim 1, wherein transmitting the at least one data frame in the CAP comprises transmitting the at least one data frame using a preferred transmit antenna pattern.

3. The method of claim 1, wherein the training comprises:
transmitting one or more training sequences from the apparatus to the other apparatus using a plurality of transmit antenna patterns; and
receiving feedback information from the other apparatus regarding a preferred transmit antenna pattern selected from the plurality of transmit antenna patterns.

4. The method of claim 3, wherein transmitting one or more training sequences to the other apparatus comprises transmitting one or more training sequences using the plurality of transmit antenna patterns, wherein the transmit antenna pattern selected for transmitting each training sequence is selected in a round robin manner.

5. The method of claim 1, wherein the training comprises:
receiving, at the apparatus, one or more training sequences transmitted from the other apparatus;
determining a preferred receive antenna pattern and at least one preferred transmit antenna pattern of the other apparatus based on the received one or more training sequences; and
sending feedback information to the other apparatus about the preferred transmit antenna pattern.

6. The method of claim 5, further comprising:
storing the preferred receive antenna pattern at the apparatus; and
transmitting, from the apparatus using the stored preferred receive antenna pattern, another CMS frame and at least one data packet in the CAP over the wireless channel of the medium next time when the medium is available for data transmission.

7. The method of claim 5, further comprising:
receiving from the other apparatus at least one data frame using the preferred receive antenna pattern.

8. The method of claim 1, wherein the preferred antenna pattern comprises either a sector direction or a beam direction.

9. A method for wireless communications, comprising:
monitoring, by an apparatus, a medium in a contention access period (CAP) for availability of the medium for data transmission by the apparatus;
after determining the medium is available for data transmission by the apparatus, obtaining the medium by transmitting, from the apparatus, a common mode signaling (CMS) frame in the CAP; and
transmitting, from the apparatus, at least one data frame to another apparatus in the CAP over a wireless channel of the medium after obtaining the medium, wherein transmitting the CMS frame comprises:
transmitting an omni-directional CMS frame, if the apparatus is capable of omni-directional transmission; and otherwise, transmitting a directional CMS frame.

10. The method of claim 9, further comprising:
transmitting one or more training sequences from the apparatus following the directional CMS frame.

11. The method of claim 9, wherein transmitting the directional CMS frame comprises:
transmitting the directional CMS frame using a transmit antenna pattern that is different than a transmit antenna pattern used to transmit a directional CMS frame when the apparatus previously obtained access to the medium, if a preferred transmit antenna pattern of the apparatus is unknown.

12. The method of claim 1, wherein the CMS frame consists of a long preamble, a physical layer (PHY) header, a media access control (MAC) header, or a header check sum (HCS) field, or any combination thereof.

13. The method of claim 12, wherein a beam tracking bit of the PHY header indicates whether or not at least one training sequence follows the CMS frame.

14. The method of claim 12, wherein the MAC header comprises information usable by another apparatus to determine whether to receive the transmitted data frame and at least one optional training sequence, or to switch to a listening mode.

15. The method of claim 12, wherein a fragmentation control field of the MAC header comprises information indicating for how long the medium will be in use.

16. The method of claim 1, further comprising:
sweeping over a set of receive antenna patterns until a preamble of a CMS frame transmitted by the other apparatus is detected;
determining, as a preferred receive antenna pattern from the set of receive antenna patterns, a receive antenna pattern used to detect the CMS frame; and
using the preferred receive antenna pattern to detect a physical layer (PHY) header of the received CMS frame.

17. The method of claim 16, wherein the preamble of the CMS frame transmitted by the other apparatus is considered as being detected if an energy level of the preamble is equal to or greater than a defined value.

18. The method of claim 1, further comprising:
detecting a long preamble of a CMS frame transmitted from the other apparatus; and
refraining from transmitting, if the long preamble is detected during a listen-before-talk period of the apparatus.

19. The method of claim 18, further comprising:
deciding, based on information in a media access control (MAC) header of the long preamble, either to receive a data packet and at least one optional training sequence or to switch to a listening mode.

20. The method of claim 18, further comprising:
decoding, at the apparatus, at least one training sequence and a physical layer (PHY) header of a data packet following the long preamble; and
switching to a sleep mode for at least a remaining duration of the data packet.

21. The method of claim 1, wherein a duration information element from a body of the transmitted CMS frame comprises information indicating to the other apparatus for how long the medium will be in use.

22. The method of claim 1, wherein transmitting the at least one data frame comprises transmitting the at least one data frame during an allocated transmit opportunity period.

23. The method of claim 1, wherein the apparatus is associated with a Symmetric Antenna System (SAS), and the method further comprising:
determining a preferred receive antenna pattern of the apparatus based on training sequences received using multiple receive antenna patterns; and
determining a preferred transmit antenna pattern of the apparatus that is same as the preferred receive antenna pattern.

24. The method of claim 23, further comprising:
transmitting from the apparatus associated with the SAS at least one data frame in the CAP using the preferred transmit antenna pattern.

25. The method of claim 1, further comprising:
detecting, at the apparatus, a transmission duration of at least one data frame transmitted from another apparatus by decoding a duration indication of a received CMS frame, wherein the duration indication is included in a media access control (MAC) header of the received CMS frame or in a duration information element of a frame body of the received CMS frame.

26. The method of claim 1, further comprising:
detecting, at the apparatus, a transmission duration of at least one data frame transmitted from another apparatus by decoding a value of a physical layer (PHY) header length field of a received data frame.

27. The method of claim 1, wherein:
transmitting the CMS frame comprises transmitting a vanguard CMS frame in a transmit opportunity period.

28. The method of claim 27, further comprising:
transmitting at least one training sequence from the apparatus during the transmit opportunity period.

29. The method of claim 1, wherein:
transmitting the CMS frame comprises transmitting a vanguard CMS frame in a transmit opportunity period; and
the method further comprising receiving at least one training sequence during the transmit opportunity period.

30. The method of claim 1, wherein:
transmitting the CMS frame comprises transmitting in a transmit opportunity period; and
wherein the data transmission over the medium in the CAP comprises transmission of multiple data frames within the transmit opportunity period.

31. The method of claim 29, further comprising:
transmitting a training sequence from the apparatus during the transmit opportunity period.

32. The method of claim 1, wherein:
transmitting the CMS frame comprises transmitting in a transmit opportunity period; and
wherein the data transmission over the medium in the CAP comprises transmission in both directions between the apparatus and the another apparatus within the transmit opportunity period.

33. The method of claim 32, further comprising:
transmitting a training sequence from the apparatus during the transmit opportunity period.

34. The method of claim 1, wherein the CMS frame transmitted over the CAP using a single carrier (SC) scheme comprises a CMS long preamble and a duration field indicating duration of the CMS frame.

35. The method of claim 34, wherein the at least one data frame following the CMS long preamble and the duration field is transmitted over the wireless channel of the medium using a preferred transmit antenna direction of the apparatus.

36. The method of claim 1, wherein the CMS frame transmitted over the CAP according to an Orthogonal Frequency Division Multiplexing High Speed Interface (OFDM HSI)

scheme comprises a HSI Modulation Coding Scheme 0 (HSI MCS0) long preamble sequence and a duration field indicating duration of the CMS frame.

37. The method of claim 1, wherein the CMS frame transmitted over the CAP according to an Orthogonal Frequency Division Multiplexing Audio/Video (OFDM AV) scheme comprises an AV Low-Rate Physical Layer (AV LRP) long preamble sequence and a duration field indicating duration of the CMS frame.

38. An apparatus for wireless communications, comprising:
a monitoring circuit configured to monitor a medium in a contention access period (CAP) for availability of the medium for data transmission by the apparatus;
a transmitter configured to obtain the medium by transmitting a common mode signaling (CMS) frame in the CAP, after determining the medium is available for data transmission by the apparatus, and wherein
the transmitter is also configured to transmit at least one data frame to another apparatus in the CAP over a wireless channel of the medium after obtaining the medium; and
a circuit configured to perform training with the other apparatus to identify one or more preferred antenna patterns to use for transmissions over the wireless channel.

39. An apparatus for wireless communications, comprising:
a monitoring circuit configured to monitor a medium in a contention access period (CAP) for availability of the medium for data transmission by the apparatus; and
a transmitter configured to obtain the medium by transmitting a common mode signaling (CMS) frame in the CAP, after determining the medium is available for data transmission by the apparatus, and wherein the transmitter is also configured to:
transmit at least one data frame to another apparatus in the CAP over a wireless channel of the medium after obtaining the medium;
transmit an omni-directional CMS frame, if the apparatus is capable of omni-directional transmission; and
otherwise, transmit a directional CMS frame.

40. The apparatus of claim 38, wherein the CMS frame consists of a long preamble, a physical layer (PHY) header, a media access control (MAC) header, or a header check sum (HCS) field, or any combination thereof.

41. The apparatus of claim 38, further comprising:
a sweeping circuit configured to sweep over a set of receive antenna patterns until a preamble of a CMS frame transmitted by the other apparatus is detected;
a processor configured to determine, as a preferred receive antenna pattern from the set of receive antenna patterns, a receive antenna pattern used to detect the CMS frame; and
a detector configured to use the preferred receive antenna pattern to detect a physical layer (PHY) header of the received CMS frame.

42. The apparatus of claim 38, wherein the apparatus is associated with a Symmetric Antenna System (SAS), and the apparatus further comprising:
a processor configured to determine a preferred receive antenna pattern of the apparatus based on training sequences received using multiple receive antenna patterns, and wherein
the processor is also configured to determine a preferred transmit antenna pattern of the apparatus that is same as the preferred receive antenna pattern.

43. The apparatus of claim 38, wherein:
the transmitter is also configured to transmit a vanguard CMS frame in a transmit opportunity period; and
the apparatus further comprising a receiver configured to receive at least one training sequence during the transmit opportunity period.

44. The apparatus of claim 38, wherein the CMS frame transmitted over the CAP using a single carrier (SC) scheme comprises a CMS long preamble and a duration field indicating duration of the CMS frame.

45. The apparatus of claim 38, wherein the CMS frame transmitted over the CAP according to an Orthogonal Frequency Division Multiplexing High Speed Interface (OFDM HSI) scheme comprises a HSI Modulation Coding Scheme 0 (HSI MCS0) long preamble sequence and a duration field indicating duration of the CMS frame.

46. The apparatus of claim 38, wherein the CMS frame transmitted over the CAP according to an Orthogonal Frequency Division Multiplexing Audio/Video (OFDM AV) scheme comprises an AV Low-Rate Physical Layer (AV LRP) long preamble sequence and a duration field indicating duration of the CMS frame.

47. An apparatus for wireless communications, comprising:
means for monitoring a medium in a contention access period (CAP) for availability of the medium for data transmission by the apparatus;
means for obtaining the medium by transmitting, from the apparatus, a common mode signaling (CMS) frame in the CAP, after determining the medium is available for data transmission by the apparatus;
means for transmitting at least one data frame to another apparatus in the CAP over a wireless channel of the medium after obtaining the medium; and
means for performing training with the other apparatus to identify one or more preferred antenna patterns to use for transmissions over the wireless channel.

48. An apparatus for wireless communications, comprising:
means for monitoring a medium in a contention access period (CAP) for availability of the medium for data transmission by the apparatus;
means for obtaining the medium by transmitting, from the apparatus, a common mode signaling (CMS) frame in the CAP, after determining the medium is available for data transmission by the apparatus; and
means for transmitting at least one data frame to another apparatus in the CAP over a wireless channel of the medium after obtaining the medium,
wherein the means for transmitting the CMS frame comprises:
means for transmitting an omni-directional CMS frame, if the apparatus is capable of omni-directional transmission; and
otherwise, means for transmitting a directional CMS frame.

49. The apparatus of claim 47, wherein the CMS frame consists of a long preamble, a physical layer (PHY) header, a media access control (MAC) header, or a header check sum (HCS) field, or any combination thereof.

50. The apparatus of claim 47, further comprising:
means for sweeping over a set of receive antenna patterns until a preamble of a CMS frame transmitted by the other apparatus is detected;
means for determining, as a preferred receive antenna pattern from the set of receive antenna patterns, a receive antenna pattern used to detect the CMS frame; and means for using the preferred receive antenna pattern to detect a physical layer (PHY) header of the received CMS frame.

51. The apparatus of claim 47, wherein the apparatus is associated with a Symmetric Antenna System (SAS), and the apparatus further comprising:
means for determining a preferred receive antenna pattern of the apparatus based on training sequences received using multiple receive antenna patterns; and
means for determining a preferred transmit antenna pattern of the apparatus that is same as the preferred receive antenna pattern.

52. The apparatus of claim 47, wherein:
the means for transmitting the CMS frame comprises means for transmitting a vanguard CMS frame in a transmit opportunity period; and
the apparatus further comprising means for receiving at least one training sequence during the transmit opportunity period.

53. The apparatus of claim 47, wherein the CMS frame transmitted over the CAP using a single carrier (SC) scheme comprises a CMS long preamble and a duration field indicating duration of the CMS frame.

54. The apparatus of claim 47, wherein the CMS frame transmitted over the CAP according to an Orthogonal Frequency Division Multiplexing High Speed Interface (OFDM HSI) scheme comprises a HSI Modulation Coding Scheme 0 (HSI MCS0) long preamble sequence and a duration field indicating duration of the CMS frame.

55. The apparatus of claim 47, wherein the CMS frame transmitted over the CAP according to an Orthogonal Frequency Division Multiplexing Audio/Video (OFDM AV) scheme comprises an AV Low-Rate Physical Layer (AV LRP) long preamble sequence and a duration field indicating duration of the CMS frame.

56. A computer-program product for wireless communications, comprising a non-transitory, tangible computer-readable storage medium encoded with instructions executable to:
monitor, by an apparatus, a medium in a contention access period (CAP) for availability of the medium for data transmission by the apparatus;
obtain the medium by transmitting, from the apparatus, a common mode signaling (CMS) frame in the CAP, after determining the medium is available for data transmission by the apparatus;
transmit, from the apparatus, at least one data frame to another apparatus in the CAP over a wireless channel of the medium after obtaining the medium; and
perform training with the other apparatus to identify one or more preferred antenna patterns to use for transmissions over the wireless channel.

57. A wireless node, comprising:
at least one antenna;
a monitoring circuit configured to monitor a medium in a contention access period (CAP) for availability of the medium for data transmission by the wireless node;
a transmitter configured to obtain the medium by transmitting via the at least one antenna a common mode signaling (CMS) frame in the CAP, after determining the medium is available for data transmission by the wireless node, and wherein
the transmitter is also configured to transmit via the at least one antenna at least one data frame to another wireless node in the CAP over a wireless channel of the medium after obtaining the medium; and
a circuit configured to perform training with the other wireless node to identify one or more preferred antenna patterns to use for transmissions over the wireless channel.

58. A method for wireless communications, comprising:
receiving, by an apparatus, a common mode signaling (CMS) frame transmitted by another apparatus indicating access to a medium for data communication by the other apparatus in a contention access period (CAP);
receiving, from the other apparatus once the access to the medium for data communication is indicated at the apparatus, at least one data frame over a wireless channel of the medium in the CAP; and
transmitting, to the other apparatus, an acknowledgement that the at least one data frame is successfully received over the wireless channel of the medium in the CAP,
wherein receiving the at least one data frame comprises receiving the at least one data frame using a preferred receive antenna pattern.

59. The method of claim 58, wherein the CMS frame transmitted by the other apparatus is an omni-directional CMS frame.

60. The method of claim 58, wherein the preferred receive antenna pattern is determined by performing training with the other apparatus.

61. A method for wireless communications, comprising:
receiving, by an apparatus, a common mode signaling (CMS) frame transmitted by another apparatus indicating access to a medium for data communication by the other apparatus in a contention access period (CAP);
receiving, from the other apparatus once the access to the medium for data communication is indicated at the apparatus, at least one data frame over a wireless channel of the medium in the CAP; and
transmitting, to the other apparatus, an acknowledgement that the at least one data frame is successfully received over the wireless channel of the medium in the CAP,
wherein the received CMS frame is a vanguard CMS frame, and the method further comprising:
sweeping over a set of receive antenna patterns for multiple defined periods of time until a long preamble of the vanguard CMS frame is detected;
determining, as a preferred receive antenna pattern, a receive antenna pattern from the set of receive antenna patterns used to detect the long preamble; and
using the preferred receive antenna pattern to detect a physical layer (PHY) header of the vanguard CMS frame.

62. The method of claim 58, further comprising:
detecting, at the apparatus, a long preamble of another CMS frame; and
refraining from transmitting if the long preamble is detected during a listen-before-talk period of the apparatus.

63. The method of claim 62, further comprising:
receiving, at the apparatus, a media access control (MAC) header of the other CMS frame; and
deciding, based on information in the MAC header, whether to receive a data packet and at least one optional training sequence or to switch to a listening mode.

64. The method of claim 62, further comprising:
decoding, at the apparatus, at least one training sequence and a physical layer (PHY) header of a data packet following the long preamble; and
switching to a sleep mode for at least a remaining duration of the data packet.

65. The method of claim 58, further comprising:
enabling an ad-hoc directional communication over the medium in the CAP.

66. The method of claim 65, wherein the ad-hoc directional communication is enabled without any communication with a network coordinator.

67. The method of claim 66, further comprising:
storing the preferred receive antenna pattern at the apparatus; and
receiving, at the apparatus using the stored preferred receive antenna pattern, another CMS frame and at least one data packet transmitted from the other apparatus over the wireless channel of the medium in the CAP.

68. The method of claim 58, wherein the received CMS frame comprises a long preamble and a duration field indicating duration of the CMS frame.

69. The method of claim 68, wherein the long preamble comprises at least one of: a CMS sequence, a High Speed Interface Modulation Coding Scheme 0 (HSI MCS0) sequence or an Audio-Video Low-Rate Physical Layer (AV LRP) sequence.

70. The method of claim 68, wherein receiving the CMS frame comprises:
receiving at least a start of the long preamble, and
wherein the medium is in use if an energy level of the received start of the long preamble is equal to or greater than a defined value.

71. The method of claim 70, further comprising:
reporting that the medium is in use by utilizing the Clear Channel Assessment (CCA) function of the apparatus.

72. The method of claim 70, further comprising:
refraining from transmitting if the start of the long preamble is received during a listen-before-talk period of the apparatus.

73. The method of claim 72, further comprising:
staying in a receive mode to obtain information about remaining duration of the CMS frame based on a value of the duration field; and
switching to a sleep mode for the remaining duration of the CMS frame.

74. An apparatus for wireless communications, comprising:
a receiver configured to receive a common mode signaling (CMS) frame transmitted by another apparatus indicating access to a medium for data communication by the other apparatus in a contention access period (CAP), wherein
the receiver is also configured to receive, from the other apparatus once the access to the medium for data communication is indicated at the apparatus, at least one data frame over a wireless channel of the medium in the CAP; and
a transmitter configured to transmit, to the other apparatus, an acknowledgement that the at least one data frame is successfully received over the wireless channel of the medium in the CAP,
wherein the receiver is also configured to receive the at least one data frame using a preferred receive antenna pattern.

75. The apparatus of claim 74, wherein the CMS frame transmitted by the other apparatus is an omni-directional CMS frame.

76. The apparatus of claim 74, wherein the preferred receive antenna pattern is determined by performing training with the other apparatus.

77. An apparatus for wireless communications, comprising:
a receiver configured to receive a common mode signaling (CMS) frame transmitted by another apparatus indicating access to a medium for data communication by the other apparatus in a contention access period (CAP), wherein
the receiver is also configured to receive, from the other apparatus once the access to the medium for data communication is indicated at the apparatus, at least one data frame over a wireless channel of the medium in the CAP; and
a transmitter configured to transmit, to the other apparatus, an acknowledgement that the at least one data frame is successfully received over the wireless channel of the medium in the CAP,
wherein the received CMS frame is a vanguard CMS frame, and the apparatus further comprising:
a sweeping circuit configured to sweep over a set of receive antenna patterns for multiple defined periods of time until a long preamble of the vanguard CMS frame is detected;
a processor configured to determine, as a preferred receive antenna pattern, a receive antenna pattern from the set of receive antenna patterns used to detect the long preamble; and
a detector configured to use the preferred receive antenna pattern to detect a physical layer (PHY) header of the vanguard CMS frame.

78. The apparatus of claim 74, further comprising:
a detector configured to detect a long preamble of another CMS frame; and
a circuit configured to refrain from transmitting if the long preamble is detected during a listen-before-talk period of the apparatus.

79. The apparatus of claim 74, further comprising:
a circuit configured to enable an ad-hoc directional communication over the medium in the CAP.

80. The apparatus of claim 74, wherein the received CMS frame comprises a long preamble and a duration field indicating duration of the CMS frame.

81. The apparatus of claim 80, wherein the receiver is also configured to receive at least a start of the long preamble, and
wherein the medium is in use if an energy level of the received start of the long preamble is equal to or greater than a defined value.

82. The apparatus of claim 81, further comprising:
a circuit configured to refrain from transmitting if the start of the long preamble is received during a listen-before-talk period of the apparatus.

83. An apparatus for wireless communications, comprising:
means for receiving a common mode signaling (CMS) frame transmitted by another apparatus indicating access to a medium for data communication by the other apparatus in a contention access period (CAP);
means for receiving, from the other apparatus once the access to the medium for data communication is indicated at the apparatus, at least one data frame over a wireless channel of the medium in the CAP; and
means for transmitting, to the other apparatus, an acknowledgement that the at least one data frame is successfully received over the wireless channel of the medium in the CAP,
wherein the means for receiving the at least one data frame comprises means for receiving the at least one data frame using a preferred receive antenna pattern.

84. The apparatus of claim 83, wherein the CMS frame transmitted by the other apparatus is an omni-directional CMS frame.

85. The apparatus of claim 83, wherein the preferred receive antenna pattern is determined by performing training with the other apparatus.

86. An apparatus for wireless communications, comprising:
   means for receiving a common mode signaling (CMS) frame transmitted by another apparatus indicating access to a medium for data communication by the other apparatus in a contention access period (CAP);
   means for receiving, from the other apparatus once the access to the medium for data communication is indicated at the apparatus, at least one data frame over a wireless channel of the medium in the CAP; and
   means for transmitting, to the other apparatus, an acknowledgement that the at least one data frame is successfully received over the wireless channel of the medium in the CAP,
   wherein the received CMS frame is a vanguard CMS frame, and the apparatus further comprising:
   means for sweeping over a set of receive antenna patterns for multiple defined periods of time until a long preamble of the vanguard CMS frame is detected;
   means for determining, as a preferred receive antenna pattern, a receive antenna pattern from the set of receive antenna patterns used to detect the long preamble; and
   means for using the preferred receive antenna pattern to detect a physical layer (PHY) header of the vanguard CMS frame.

87. The apparatus of claim 83, further comprising:
   means for detecting a long preamble of another CMS frame; and
   means for refraining from transmitting if the long preamble is detected during a listen-before-talk period of the apparatus.

88. The apparatus of claim 83, further comprising:
   means for enabling an ad-hoc directional communication over the medium in the CAP.

89. The apparatus of claim 83, wherein the received CMS frame comprises a long preamble and a duration field indicating duration of the CMS frame.

90. The apparatus of claim 89, wherein the means for receiving the CMS frame comprises:
   means for receiving at least a start of the long preamble, and
   wherein the medium is in use if an energy level of the received start of the long preamble is equal to or greater than a defined value.

91. The apparatus of claim 90, further comprising:
   means for refraining from transmitting if the start of the long preamble is received during a listen-before-talk period of the apparatus.

92. A computer-program product for wireless communications, comprising a non-transitory, tangible computer-readable storage medium encoded with instructions executable to:
   receive, by an apparatus, a common mode signaling (CMS) frame transmitted by another apparatus indicating access to a medium for data communication by the other apparatus in a contention access period (CAP);
   receive, from the other apparatus once the access to the medium for data communication is indicated at the apparatus, at least one data frame over a wireless channel of the medium in the CAP; and
   transmit, to the other apparatus, an acknowledgement that the at least one data frame is successfully received over the wireless channel of the medium in the CAP,
   wherein receiving the at least one data frame comprises receiving the at least one data frame using a preferred receive antenna pattern.

93. A wireless node, comprising:
   at least one antenna;
   a receiver configured to receive via the at least one antenna a common mode signaling (CMS) frame transmitted by another wireless node indicating access to a medium for data communication by the other wireless node in a contention access period (CAP), wherein
   the receiver is also configured to receive via the at least one antenna, from the other wireless node once the access to the medium for data communication is indicated at the wireless node, at least one data frame over a wireless channel of the medium in the CAP; and
   a transmitter configured to transmit via the at least one antenna, to the other wireless node, an acknowledgement that the at least one data frame is successfully received over the wireless channel of the medium in the CAP,
   wherein the receiver is also configured to receive the at least one data frame using a preferred receive antenna pattern.

* * * * *